(12) United States Patent
Worley et al.

(10) Patent No.: US 11,650,764 B2
(45) Date of Patent: *May 16, 2023

(54) SOLID STATE DRIVE MULTI-CARD ADAPTER WITH INTEGRATED PROCESSING

(71) Applicant: Samsung Electronics Co., Ltd., Suwon-si (KR)

(72) Inventors: Fred Worley, San Jose, CA (US); Harry Rogers, San Jose, CA (US); Gunneswara Marripudi, Fremont, CA (US); Zhan Ping, Milpitas, CA (US); Vikas Sinha, Sunnyvale, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 17/206,106

(22) Filed: Mar. 18, 2021

(65) Prior Publication Data

US 2021/0208821 A1    Jul. 8, 2021

Related U.S. Application Data

(63) Continuation of application No. 17/088,571, filed on Nov. 3, 2020, now Pat. No. 10,996,896, which is a
(Continued)

(51) Int. Cl.
*G06F 3/06* (2006.01)
*G06F 13/42* (2006.01)
*G06F 13/40* (2006.01)

(52) U.S. Cl.
CPC .......... *G06F 3/0661* (2013.01); *G06F 3/0613* (2013.01); *G06F 3/0629* (2013.01);
(Continued)

(58) Field of Classification Search
CPC .... G06F 3/0661; G06F 3/0613; G06F 3/0629; G06F 3/0632; G06F 3/0658;
(Continued)

(56) References Cited

U.S. PATENT DOCUMENTS 7,114,015 B2    9/2006    Alva et al.
7,581,040 B2    8/2009    Irisawa
(Continued)

FOREIGN PATENT DOCUMENTS

EP          2765501 A1    8/2014
KR      20130098641 A    9/2013
(Continued)

OTHER PUBLICATIONS

Advisory Action for U.S. Appl. No. 16/986,231 dated Nov. 18, 2021.
(Continued)

*Primary Examiner* — Ernest Unelus
(74) *Attorney, Agent, or Firm* — Renaissance IP Law Group LLP

(57) ABSTRACT

Embodiments of the inventive concept include solid state drive (SSD) multi-card adapters that can include multiple solid state drive cards, which can be incorporated into existing enterprise servers without major architectural changes, thereby enabling the server industry ecosystem to easily integrate evolving solid state drive technologies into servers. The SSD multi-card adapters can include an interface section between various solid state drive cards and drive connector types. The interface section can perform protocol translation, packet switching and routing, data encryption, data compression, management information aggregation, virtualization, and other functions.

21 Claims, 13 Drawing Sheets

Related U.S. Application Data continuation of application No. 16/986,231, filed on Aug. 5, 2020, which is a continuation of application No. 16/149,034, filed on Oct. 1, 2018, now Pat. No. 10,747,473, which is a continuation of application No. 14/951,480, filed on Nov. 24, 2015, now Pat. No. 10,140,063.

(60) Provisional application No. 62/161,635, filed on May 14, 2015, provisional application No. 62/127,203, filed on Mar. 2, 2015.

(52) U.S. Cl.
CPC .......... *G06F 3/0632* (2013.01); *G06F 3/0658* (2013.01); *G06F 3/0683* (2013.01); *G06F 3/0688* (2013.01); *G06F 13/4022* (2013.01); *G06F 13/4081* (2013.01); *G06F 13/4282* (2013.01)

(58) Field of Classification Search
CPC .... G06F 3/0659; G06F 3/0688; G06F 3/0683; G06F 13/4022; G06F 13/4081; G06F 13/4282
See application file for complete search history.

(56) References Cited

U.S. PATENT DOCUMENTS

| | | |
|---|---|---|
| 7,779,184 B2 | 8/2010 | Hubert et al. |
| 7,975,105 B1 | 7/2011 | Sun et al. |
| 8,130,492 B2 | 3/2012 | Tsukazawa |
| 8,310,836 B2 | 11/2012 | Schuette |
| 8,446,729 B2 | 5/2013 | Schuette |
| 8,693,208 B2 | 4/2014 | Reinke et al. |
| 8,949,517 B2 | 2/2015 | Cohen et al. |
| 9,049,005 B2 | 6/2015 | Cho et al. |
| 9,128,662 B2 | 9/2015 | Kim et al. |
| 9,286,255 B2 | 3/2016 | Chen et al. |
| 9,310,784 B1 | 4/2016 | Roy |
| 9,348,525 B2 | 5/2016 | McKean et al. |
| 9,389,952 B2 | 7/2016 | Yu et al. |
| 9,519,318 B2 | 12/2016 | Davis et al. |
| 9,542,244 B2 | 1/2017 | McGarry et al. |
| 9,619,164 B2 | 4/2017 | Mehta et al. |
| 9,746,886 B2 | 8/2017 | Davis et al. |
| 9,870,242 B2 | 1/2018 | Koch et al. |
| 10,021,806 B2 | 7/2018 | Schnell et al. |
| 10,324,642 B2 | 6/2019 | Sweere et al. |
| 2009/0063895 A1 | 3/2009 | Smith |
| 2010/0049914 A1 | 2/2010 | Goodwin |
| 2010/0281207 A1 | 11/2010 | Miller et al. |
| 2010/0296236 A1 | 11/2010 | Schuette |
| 2011/0197008 A1 | 8/2011 | Itou et al. |
| 2011/0320690 A1 | 12/2011 | Petersen et al. |
| 2013/0163175 A1 | 6/2013 | Kim et al. |
| 2013/0294023 A1 | 11/2013 | Gay |
| 2013/0304775 A1 | 11/2013 | Davis et al. |
| 2014/0040639 A1* | 2/2014 | Raam ............... G06F 21/78 713/193 |
| 2014/0049265 A1 | 2/2014 | Oh |
| 2014/0181370 A1 | 6/2014 | Cohen et al. |
| 2014/0195573 A1* | 7/2014 | Nakagawa ............ G06F 3/0665 707/827 |
| 2014/0268536 A1 | 9/2014 | Herman et al. |
| 2014/0353264 A1 | 12/2014 | Venugopal et al. |
| 2014/0359189 A1 | 12/2014 | Kotzur et al. |
| 2015/0277512 A1 | 10/2015 | Davis et al. |
| 2015/0362965 A1 | 12/2015 | Davis et al. |
| 2016/0255740 A1 | 9/2016 | Ping et al. |
| 2016/0259597 A1 | 9/2016 | Worley et al. |
| 2016/0259754 A1 | 9/2016 | Ping |
| 2016/0306768 A1 | 10/2016 | Mataya |
| 2017/0005422 A1 | 1/2017 | So et al. |
| 2017/0010808 A1 | 1/2017 | Jacobs et al. |
| 2017/0164501 A1 | 6/2017 | Killen et al. |
| 2017/0168943 A1 | 6/2017 | Chou et al. |
| 2017/0228179 A1 | 8/2017 | Levinson et al. |

FOREIGN PATENT DOCUMENTS

| | | |
|---|---|---|
| KR | 20140101338 A | 8/2014 |
| KR | 20140101684 A | 8/2014 |
| KR | 20140110004 A | 9/2014 |
| WO | 2013091104 A1 | 6/2013 |

OTHER PUBLICATIONS

Final Office Action for U.S. Appl. No. 16/986,231 dated Sep. 7, 2021.
Office Action for U.S. Appl. No. 16/986,231 dated Mar. 7, 2022.
"M.2 SSD and mSATA SSD to USB 3.1 and SATA III Adapter"; 3 pages, Retrieved Nov. 2017 (Year: 2017).
"PCI Express Base Specification Revision 3.0" United States Copyright Office. Copyright Catalog (1978 to present) [online]. Registration No. TX0007351052. Registration Date Dec. 16, 2010. [Retrieved on Nov. 8, 2017]. Retrieved from the Internet.
"Slim ODD Caddy for mSATA & M.2 SSD"; 3 pages, Retrieved Nov. 2017 (Year: 2017).
"ZTC 2-in-1 Thunder Board M.2 (NGFF) or mSATA SSD to SATA III Adapter Board", 3 pages, Retrieved Nov. 2017 (Year: 2017).
Ableconn—"Convert mSATA or M.2 SATA SSD to a 2 5" 7mm SATA Drive"; 4 pages, Retrieved Nov. 2017 (Year: 2017).
Addonics Technologies, Inc. "M2 PCIe SSD + 2 M2 SSD PCIe 3.0 4X", 2015, 2 pages.
Advisory Action for U.S. Appl. No. 14/918,556 dated May 17, 2018.
amazon.com product page for "Syba-M.2 B-Key or mSATA SSD Dual Connector to Sata III 2.5" Enclosure", model No. SY-ADA40093; 9 pages, Retrieved on May 29, 2018, public availability date of Feb. 1, 2015 (Year 2015).
Bplus Tech, "M2P4A", PCIe 2.0 x 4 to M.2 (NGFF) SSD Adapter, 2015, 2 pages.
Final Office Action for U.S. Appl. No. 14/918,556 dated Mar. 1, 2018.
Final Office Action for U.S. Appl. No. 14/951,480 dated Jun. 5, 2018.
Final Office Action for U.S. Appl. No. 16/149,034 dated Sep. 5, 2019.
Gen-Z Consortium, "Gen-Z Overview", Jul. 2017, 22 pages.
Gen-Z Consortium,"Core Specification", Version 1.0, 983 pages, 2016-2018.
Notice of Allowance for U.S. Appl. No. 14/951,480 dated Jul. 24, 2018.
Notice of Allowance for U.S. Appl. No. 16/149,034 dated Apr. 9, 2020.
Notice of Allowance for U.S. Appl. No. 17/088,571 dated Jan. 19, 2021.
Office Action for U.S. Appl. No. 14/918,556 dated Aug. 18, 2017.
Office Action for U.S. Appl. No. 14/951,480 dated Dec. 14, 2017.
Office Action for U.S. Appl. No. 16/149,034 dated Apr. 11, 2019.
Office Action for U.S. Appl. No. 16/149,034 dated Dec. 19, 2019.
Office Action for U.S. Appl. No. 16/986,231 dated Mar. 15, 2021.
PCI-SIG, "PCI Express Base Specification Revision 3.0," Section 4.2.4.10.1, Nov. 10, 2010, pp. 242-243.
startech.com, "M.2 NGFF SSD to 2.5in SATA SSD Converter", SAT3M225, 2015, 11 pages.
Syba USA, "SATA III to M.2 & mSATA SSD Enclosure Assembly Guide", 2015, 1 page.
Final Office Action for U.S. Appl. No. 16/986,231 dated Aug. 16, 2022.
Office Action for U.S. Appl. No. 16/986,231 dated Dec. 28, 2022.

* cited by examiner

SOLID STATE DRIVE MULTI-CARD ADAPTER WITH INTEGRATED PROCESSING

RELATED APPLICATION DATA

This application is a continuation of U.S. patent application Ser. No. 17/088,571, filed Nov. 3, 2020, which is a continuation of U.S. patent application Ser. No. 16/986,231, filed Aug. 5, 2020, which is a continuation of U.S. patent application Ser. No. 16/149,034, filed Oct. 1, 2018, now issued as U.S. Pat. No. 10,747,473, which is a continuation of U.S. patent application Ser. No. 14/951,480, filed Nov. 24, 2015, now issued as U.S. Pat. No. 10,140,063, which claims the benefit of U.S. Patent Application Ser. No. 62/161,635, filed May 14, 2015, and claims the benefit of U.S. Patent Application Ser. No. 62/127,203, filed Mar. 2, 2015, which are hereby incorporated by reference.

BACKGROUND

The present inventive concepts relate to enterprise server solutions, and more particularly, to managing and processing data stored in solid state drive (SSD) adapters for use with enterprise servers.

Enterprise servers provide computing and storage power for the Internet, the emerging Internet of Things, and myriad business intranets and applications. To some extent, enterprise servers make possible the conveniences of modern civilization. For example, trucking and transportation logistics rely heavily on enterprise computer servers. Internet searching, social networks, and social media also depend directly on a robust enterprise server infrastructure. These are but a few of the many industries that depend on such crucial compute resources.

But traditional enterprise server implementations lack density and performance-centric storage capabilities, and have limited or no support for recent developments in solid state drives (SSDs). The industry still heavily relies on magnetic hard disk drive (HDD) implementations. Developments in the SSD field have advanced storage technologies in general, but are not easily adaptable to existing enterprise server applications without major architectural changes and large investments in infrastructure updates. Computer systems and associated peripheral enclosures support industry standard form factors for storage media, such as small form factor (SFF) 2.5 inch hard disk drives (HDDs) and large form factor (LFF) 3.5 inch HDDs.

The development of solid state drives (SSDs) as storage devices for computer systems and the potential for existing and emerging memory technologies such as dynamic random access memory (DRAM), persistent RAM (PRAM), and the like, enable new form factors for storage devices, both volatile and non-volatile. The constraints of a motor and platter mechanics inherent to HDDs can be removed. Some conventional adapters allow a device of one form factor to be used in a bay designed for another (e.g., larger) form factor, but only allow connection of a single device within the adapter. Conventional approaches for managing and processing data stored in such SSD devices lack the ability to manage and protect data across multiple disparate mixed-format and/or mixed-protocol devices. Also, there is no effective way to aggregate management information including, for example, thermal data, nor the ability to automatically adjust a storage environment in response to such aggregated data. Embodiments of the present inventive concept address these and other limitations in the prior art.

BRIEF SUMMARY

Embodiments of the inventive concept can include a solid state drive (SSD) multi-card adapter. The SSD multi-card adapter can have or otherwise conform to a hard disk drive form factor, although it will be understood that the SSD multi-card adapter need not have a hard disk drive form factor. Rather, the SSD multi-card adapter can conform to any form factor suitable to the storage system. The adapter can include a connector, an interface section coupled to the connector, and one or more mixed-format solid state drive connectors coupled to the interface section. The adapter can be configured to receive one or more mixed-format non-volatile memory units.

Embodiments of the inventive concept can include a computer server system. The computer server system can include an enclosure including one or more hard disk drive form factor bays and one or more SSD multi-card adapters. The one or more SSD multi-card adapters can be seated within the drive bays. At least one of the SSD adapters can include a connector, an interface section coupled to the connector, and one or more mixed-format solid state drive connectors coupled to the interface section, and configured to receive one or more mixed-format non-volatile memory units. The connector can be wide enough to meet throughput requirements of non-volatile memory media. The connector can be a cable connector, a slot, a port, or any other suitable kind of connector.

Embodiments can include a computer-implemented method for managing data. The method can include receiving, by an SSD multi-card adapter, information from a host enclosure using an enclosure-specific protocol. The method can include communicating, by an interface section of the SSD multi-card adapter, with one or more mixed-format non-volatile memory units of the SSD multi-card adapter.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1:
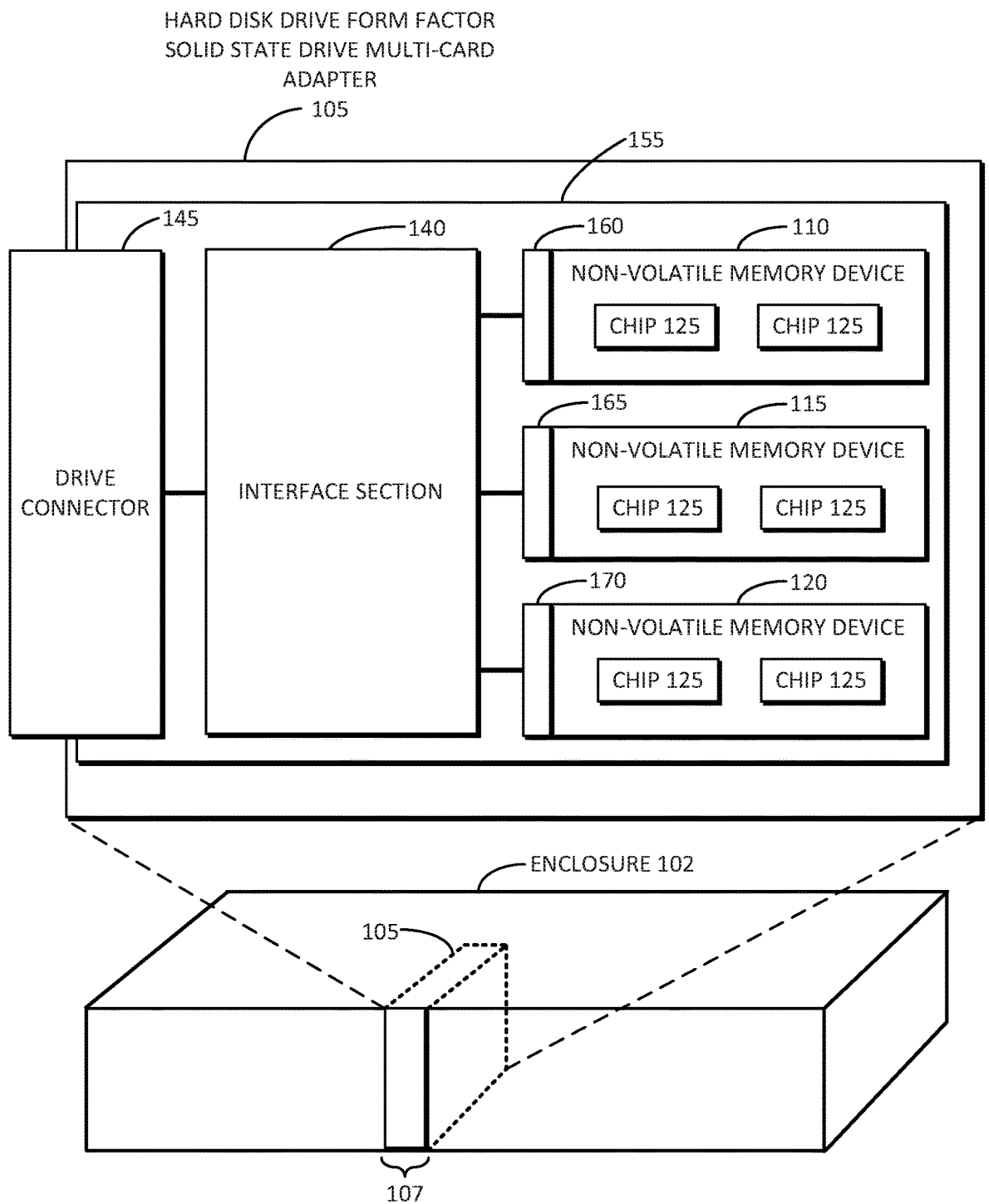
FIG. 1 is an example block diagram of an SSD multi-card adapter and an associated storage enclosure in accordance with embodiments of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first multi-card module could be termed a second multi-card module, and, similarly, a second multi-card module could be termed a first multi-card module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept include solid state drive (SSD) multi-card adapters that can include multiple mixed-format mixed-protocol solid state drive cards, which can be incorporated into existing enterprise servers without major architectural changes, thereby enabling the server industry ecosystem to easily integrate solid state drive technology into servers. The SSD multi-card adapters can have or otherwise conform with a hard disk drive form factor. The hard disk drive form factor can include, for example, a 2.5 inch hard disk drive form factor, a 1.8 inch hard disk drive form factor, a 3.5 inch hard disk drive form factor, or the like. It will be understood that any suitable hard disk drive form factor can be adapted in accordance with embodiments of the present inventive concept. The solid state drive cards can include form factors such as M.2 solid state drive cards, or the like.

Multiple solid state drive cards and an interface section can be included within an SSD multi-card adapter. The interface section can include a protocol switch, a protocol hub, a protocol bus, a compute resource, or the like. For example, the compute resource can include a system-on-a-chip (SOC), a field programmable gate array (FPGA), a multi-chip module, a special purpose application specific integrated circuit (ASIC), or the like, within the adapter. In some embodiment, the interface section can include a peripheral component interconnect express (PCIe) switch, hub, bus, or the like, although it will be understood that any suitable kind of switch can be used. The interface section can virtualize the storage resources and/or provide data protection transparent to a host computer, a host enclosure, a computer server system, or the like. The host computer or enclosure can support one or more protocols for communication to a given storage device.

According to embodiments of the inventive concept, multiple protocols such as PCIe, serial attached SCSI (SAS), serial ATA (SATA), or the like, can be supported within the same system, as further described in detail below. The protocols provided by the infrastructure of the computer system or storage enclosure to a given bay within the computer system or storage enclosure can be referred to as "native bay protocols." In some embodiments, multiple types of storage devices can share an adapter. For example, the number of devices within the adapter can exceed the connectivity requirements of the usual number of devices within a particular type of computer server or storage enclosure. Embodiments of the inventive concept disclosed herein provide mechanisms for distributing power, data, and/or non-data (e.g., metadata or management information) signals between the storage devices and a shared connector of the adapter.

Embodiments of the inventive concept include the ability to support multiple types of memory and/or storage or a mix of memory and/or storage. For example, an interface section such as a SOC can be attached to DRAM and/or to PCIe-attached or SATA-attached flash, which can be made available as storage to a host computer or enclosure, either explicitly or transparently. Protocol translation can be performed between a protocol supported at the adapter bay interface and a protocol supported by the memory and/or storage devices incorporated within the adapter, as further explained in detail below. For example, a SOC with RAM and multiple NVMe SSD devices can be placed in an adapter with a SAS or SATA connector, and can emulate for the host computer or enclosure the behavior of a SAS or SATA devices, while using the RAM as cache for the adapter to improve performance. The NVMe SSDs can be used as persistent storage with redundancy or other data services, as further described below.

The interface section within the adapter can provide data services such as striping or erasure coding across the multiple storage and/or memory devices (e.g., RAID0, RAID1, RAID5, or the like). Alternatively or in addition, the interface section can create one or more virtual pools from the physical devices to provide data management services. In addition, the interface section can provide the ability to do data processing in addition to data access for the set of memory or storage devices within the adapter. The interface section can provide data encryption, data protection, data compression, and/or data deduplication on data stored on one or more mixed-format mixed-protocol non-volatile memory units, as described in detail below. The interface section can provide in-band or out-of-band aggregation of management information including, for example, thermal data from thermal sensors within the adapter, as also described in detail below.

The SSD adapters can be attached to or seated within drive bays of a computer server that supports non-volatile memory express (NVMe) drives without any changes to the server architecture, thereby providing a straight-forward upgrade path. In this manner, existing computer and peripheral enclosure infrastructure and ecosystems can be reused, but with increased capacity and performance. For servers that support only SAS and/or SATA magnetic hard disk drives, a relatively simple backplane update can be made to bridge the PCIe/NVMe technology so that the server can access, for example, the M.2 solid state drive cards of the multi-card adapters. Alternatively, in some embodiments, internal changes such as cabling or port upgrades can be made to bridge the PCIe/NVMe technology without changes to the backplane so that the server can access the M.2 solid state drive cards of the multi-card adapters.

The SSD multi-card adapters provide a low-cost alternative to traditional magnetic HDD technology. In addition, using the multi-card adapters, users can attach a different number of solid state drive cards in each adapter, thereby changing the storage density based on capacity and performance requirements. Due to the modular nature of the SSD multi-card adapters, users can expand or reduce storage capacity density as needed quickly and easily. Multiple devices can share a common adapter enclosure to optimize use of the volume within a standard form factor size, and to provide greater flexibility and functionality for use of the existing infrastructure for HDD form factors with diverse types and amounts of storage media.

FIG. 1 is an example block diagram of an SSD multi-card adapter 105 and an associated storage enclosure 102 in accordance with embodiments of the inventive concept. The SSD multi-card adapter 105 can have a hard disk drive form factor. In other words, the SSD multi-card adapter 105 can be configured to fit within conventional hard disk drive form factor drive bays and can be compatible with enterprise server systems and/or enclosures supporting such form factors, but at a cost per unit of storage that is significantly reduced, while having a level of performance that is significantly increased. It will be understood that a variety of hard disk drive form factors incorporating the inventive concept disclosed herein can be used. For example, the hard disk drive form factor can include, for example, a 1.8 inch hard disk drive form factor, a 2.5 inch hard disk drive form factor, a 3.5 inch hard disk drive form factor, or the like. It will be understood that any suitable hard disk drive form factor or any other kind of form factor can be adapted in accordance with embodiments of the present inventive concept. The space 107 within a server or peripheral enclosure 102 into which the SSD adapter 105 can be inserted, is generally referred to herein as a drive bay, which is sometimes referred to in the industry as a drive slot.

The SSD multi-card adapter 105 can include a circuit board 155 including a connector 145. For example, the connector 145 can be capable of supporting a storage communication protocol such as an SFF-8639 connector, an Ethernet connector (RJ45, CX4, or the like), a hard disk drive connector, a connector type used to connect computer peripherals, a connector used to connect network storage, and/or any suitable kind of connector. The SSD adapter 105 can include an interface section 140 coupled to the circuit board 155 and electrically coupled to the connector 145. The interface section 140 can include a switch, such as a PCIe switch, a protocol switch, a protocol hub, a protocol bus, a compute resource, a processing element, a serial attached SCSI (SAS) expander, a SAS switch, a serial ATA (SATA) hub, an Ethernet switch, an Infiniband switch, a Fibre Channel (FC) switch, or the like, which can connect to non-volatile memory devices, as further described below. The interface section 140 can route a data signal from the connector 145 of the adapter 105 to one or more ports of one or more non-volatile memory devices (e.g., 110, 115, and 120), such as solid state drive cards. The interface section 140 can replicate and/or distribute the data signal to multiple interconnected devices (e.g., 110, 115, and 120). In some embodiments, the data signal can pass from the connector 145 of the adapter 105 to the devices within the adapter 105 via the interface section 140 without modification.

The SSD adapter 105 can further include one or more solid state drive connectors (e.g., 160, 165, and 170) that can be coupled to the circuit board 155. The one or more solid state drive connectors (e.g., 160, 165, and 170) can be electrically coupled to the interface section 140. One or more M.2 solid state drive connectors (e.g., 160, 165, and 170) can be configured to receive one or more solid state drive cards (e.g., 110, 115, and 120), for example. Each of the one or more solid state drive cards (e.g., 110, 115, and 120) can be seated in a corresponding solid state drive connector (e.g., 160, 165, and 170). Each of the one or more solid state drive cards (e.g., 110, 115, and 120) can include one or more solid state drive chips 125 configured to communicate via the interface section 140 and the connector 145.

The one or more solid state drive chips 125 can include, for example, one or more storage or memory devices. The one or more solid state drive chips 125 can include, for example, double data rate (DDR)-attached memory, SSD devices attached via PCIe, serial attached SCSI (SAS), serial ATA (SATA), SSD devices in M.2 or SFF form factors, HDD devices, persistent random access memory (PRAM) devices, resistive RAM (RRAM or ReRAM), phase change RAM (PRAM), magnetoresistive RAM (MRAM), and/or other suitable types of memories and storage devices.

The SSD adapter 105 can be installed in an existing server or storage enclosure 102 that supports drive bays (e.g., 107) of a standard size and connector type, as further explained below. The one or more solid state drive chips 125, which can include storage or memory devices, can be discovered and/or used by the attaching server or storage enclosure without modification to the physical configuration of the server or storage enclosure.

A drive connector 145 can be shared between the one or more solid state drive cards (e.g., 110, 115, and 120), through which a single interface can be provided between the adapter 105 and the existing infrastructure within a server or storage enclosure. It will be understood that the one or more solid state drive chips 125 can each include multiple physical data paths and/or interfaces, each with a separate connector, for example, to allow redundancy. Such physical data paths and/or interfaces can be connected through each corresponding separate connector to the drive connector 145.

The connector 145 can be shared among the one or more solid state drive cards (e.g., 110, 115, and 120) and/or the one or more solid state drive chips 125 by way of the interface section 140. As mentioned above, the interface section 140 can include a protocol switch, a protocol hub, a protocol bus, a compute resource, a processing element, or the like. The interface section 140 and/or the one or more solid state drive chips 125 can include a compute resource, such as a system-on-a-chip (SOC), a field programmable gate array (FPGA), a multi-chip module, a special purpose application specific integrated circuit (ASIC), or the like, within the adapter 105. The connector 145 can be shared among the one or more solid state drive cards (e.g., 110, 115, and 120) and/or the one or more solid state drive chips 125 by leveraging functionality provided by the compute resources of the interface section 140 (by the SOC, FPGA, ASIC, or the like). The connector 145 can be connected to the compute resource, as further described below, which can provide access to and/or serve as an aggregation point for the one or more solid state drive cards (e.g., 110, 115, and 120) or other components within the adapter 105. It will be understood that such a compute resource can be included within, operate in tandem with, and/or in place of the interface section 140, as discussed below.

Figure 2:
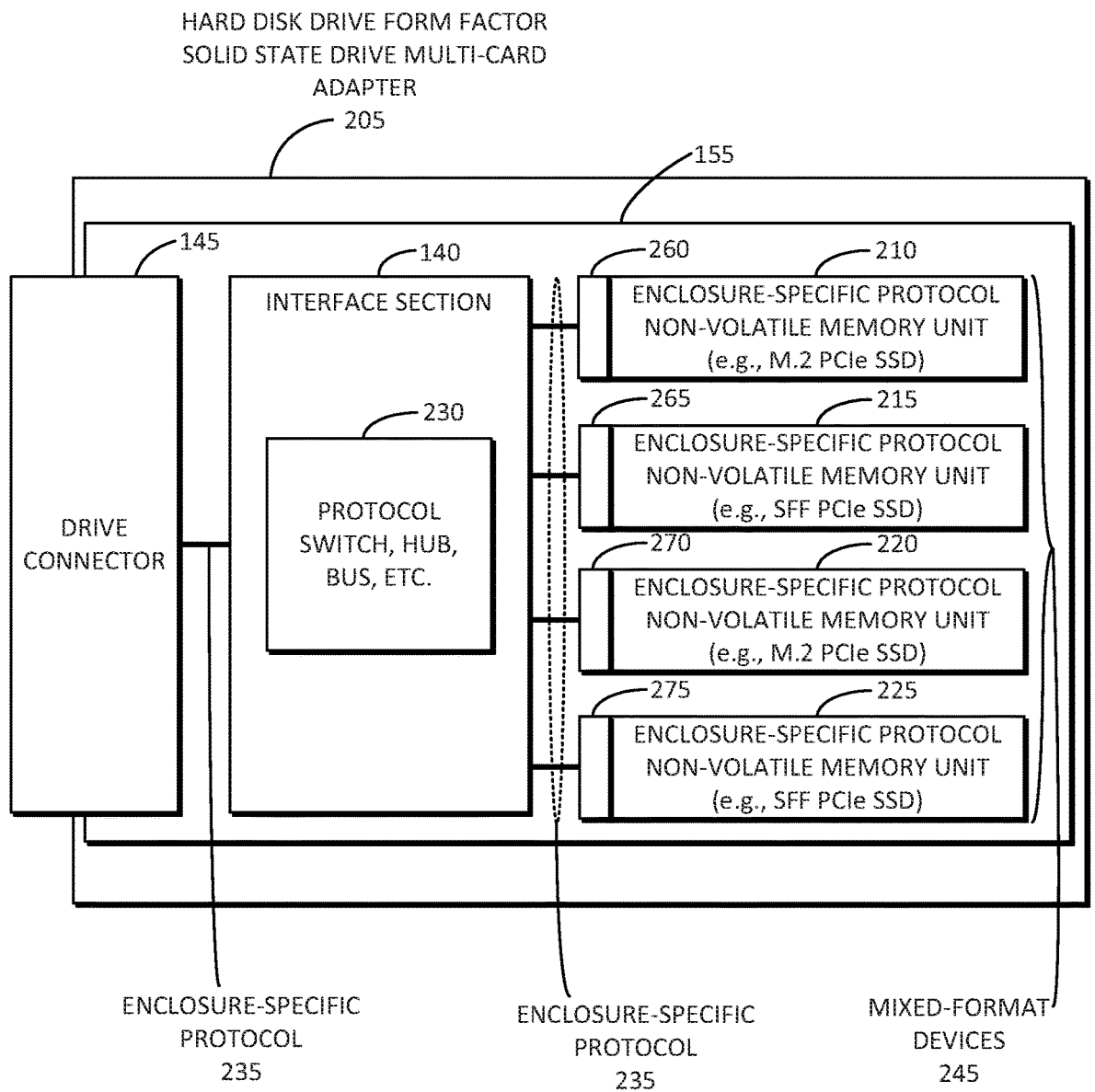
FIG. 2 is an example block diagram of an SSD multi-card adapter including mixed-format devices in accordance with embodiments of the inventive concept.

FIG. 2 is an example block diagram of an SSD multi-card adapter 205 including mixed-format devices 245 in accordance with embodiments of the inventive concept. Some of the elements illustrated in FIG. 2 are described above, and therefore, a detailed description is not repeated. The SSD multi-card adapter 205 can include a connector 145, an interface section 140 coupled to the connector 145, one or more mixed-format solid state drive connectors (e.g., 260, 265, 270, and 275) coupled to the interface section 140, and/or a compute resource, as further described below. The one or more mixed-format solid state drive connectors (e.g., 260, 265, 270, and 275) can receive one or more mixed-format non-volatile memory units (e.g., 210, 215, 220, and 225), respectively.

The one or more mixed-format solid state drive connectors (e.g., 260, 265, 270, and 275) can include, for example, one or more M.2 solid state drive connectors and one or more small form factor (SFF) solid state drive connectors. The one or more mixed-format non-volatile memory units (e.g., 210, 215, 220, and 225) can include, for example, one or more M.2 solid state drive cards and one or more SFF solid state drive cards. Each of the one or more M.2 solid state drive cards can be seated in a corresponding M.2 solid state drive connector. Similarly, each of the one or more SFF solid state drive cards can be seated in a corresponding SFF solid state drive connector. It will be understood that any suitable kind of solid state drive connector and corresponding non-volatile memory unit can be used.

The interface section 140 can include at least one of a protocol switch, a protocol hub, or a protocol bus 230, which can receive information, using an enclosure-specific protocol 235, from the connector 145, and to communicate with each of the mixed-format non-volatile memory units (e.g., 210, 215, 220, and 225) using the enclosure-specific protocol 235. In some embodiments, the interface section 140 can include at least one of a peripheral component interconnect express (PCIe) switch, a PCIe hub, or a PCIe bus. The enclosure-specific protocol 235 can include a PCIe protocol, an Ethernet protocol, an Infiniband protocol, an FC protocol, or the like. It will be understood that any suitable enclosure-specific protocol can be used.

The interface section 140, the one or more mixed-format solid state drive connectors (e.g., 260, 265, 270, and 275), and the one or more mixed-format non-volatile memory units (e.g., 210, 215, 220, and 225) can be configured to substantially fit within a hard disk drive form factor. In some embodiments, the adapter 205 includes four mixed-format SSD devices 245, which share a common protocol within the adapter 205, and with the enclosure 102 (of FIG. 1). It will be understood that any suitable number of mixed-format devices 245 can be included within the adapter 205.

Figure 3:
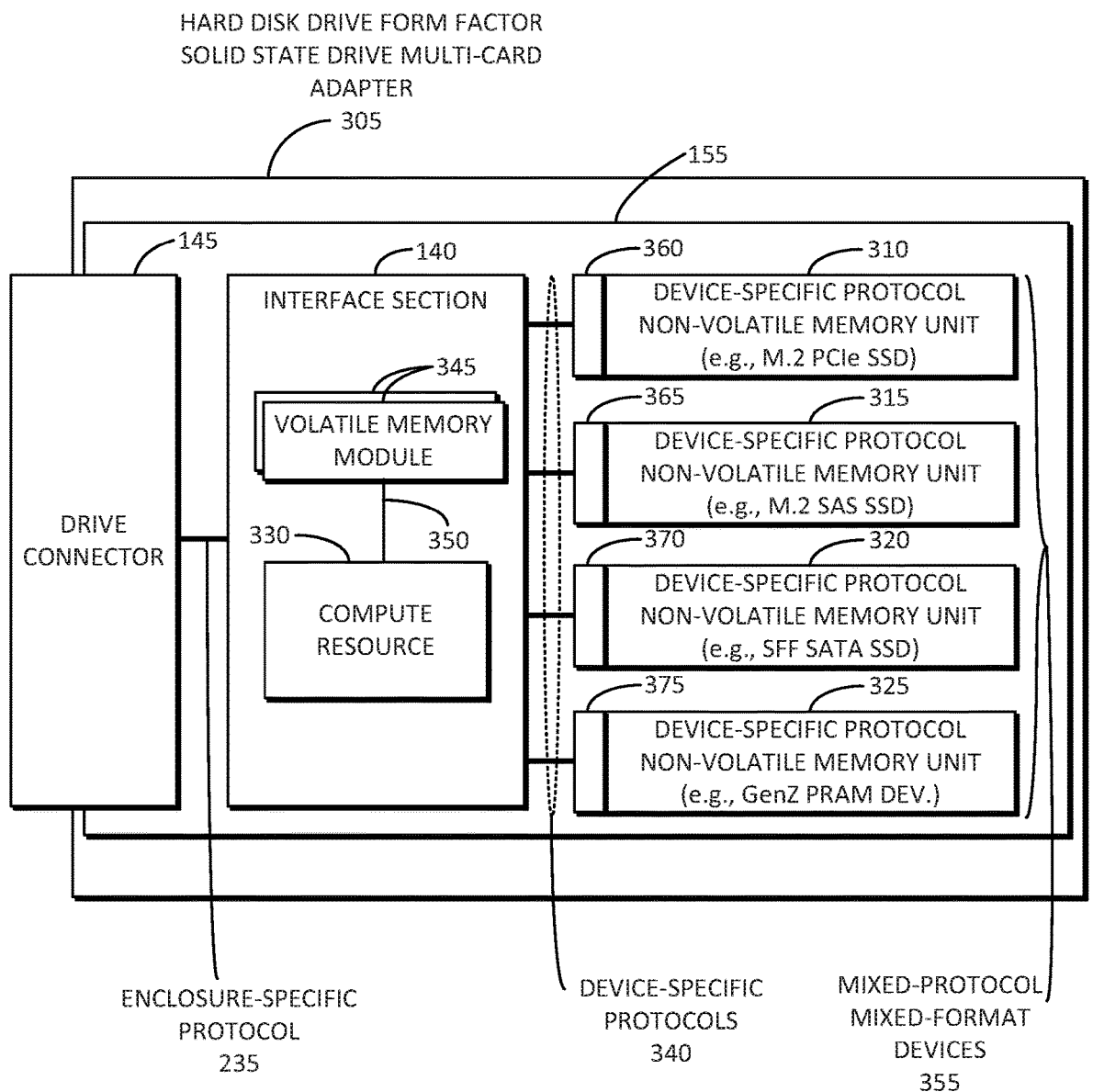
FIG. 3 is an example block diagram of an SSD multi-card adapter including mixed-protocol mixed-format devices in accordance with embodiments of the inventive concept.

FIG. 3 is an example block diagram of an SSD multi-card adapter 305 including mixed-protocol mixed-format devices 355 in accordance with embodiments of the inventive concept. Some of the elements illustrated in FIG. 3 are described above, and therefore, a detailed description is not repeated.

The SSD multi-card adapter 305 can include a connector 145, an interface section 140 coupled to the connector 145, and one or more mixed-format mixed-protocol solid state drive connectors (e.g., 360, 365, 370, and 375) coupled to the interface section 140. The one or more mixed-format mixed-protocol solid state drive connectors (e.g., 360, 365, 370, and 375) can receive one or more mixed-format mixed-protocol non-volatile memory units (e.g., 310, 315, 320, and 325), respectively.

The one or more mixed-format mixed-protocol solid state drive connectors (e.g., 360, 365, 370, and 375) can include, for example, one or more M.2 solid state drive connectors, one or more small form factor (SFF) solid state drive connectors, or the like. The one or more mixed-format mixed-protocol non-volatile memory units (e.g., 310, 315, 320, and 325) can include, for example, one or more M.2 PCIe solid state drive cards, one or more M.2 SAS solid state drive cards, one or more SFF SATA solid state drive cards, and/or one or more GenZ PRAM devices, or the like. It will be understood that any suitable kind of solid state drive connector and corresponding non-volatile memory unit can be used. Each of the one or more solid state drive cards can be seated in a corresponding solid state drive connector.

The interface section 140 can include a compute resource 330. The one or more mixed-format mixed-protocol non-volatile memory units (e.g., 310, 315, 320, and 325) can be coupled to the compute resource 330. In addition, the interface section 140 can include one or more volatile memory units 345, such as DRAM modules. The compute resource 330 can be communicatively coupled to the one or more volatile memory units 345 via line 350. The compute resource 330 can receive information, using an enclosure-specific protocol 235, from the connector 145. The one or more volatile memory units 345 can cache at least some of the received information. The compute resource 330 can communicate with each of the mixed-format mixed-protocol non-volatile memory units (e.g., 310, 315, 320, and 325) using corresponding device-specific protocols 340. Each of the device-specific protocols 340 can be the same as or different from the enclosure-specific protocol 235.

For example, the corresponding device-specific protocols 340 can include one or more of a peripheral component interconnect express (PCIe) protocol, a serial ATA (SATA) protocol, a serial attached SCSI (SAS) protocol, an Ethernet protocol, an Infiniband protocol, an FC protocol, or the like.

For example, the one or more mixed-format mixed-protocol non-volatile memory units (e.g., 310, 315, 320, and 325) can include one or more of a PCIe solid state drive unit (e.g., 310), a SATA solid state drive unit (e.g., 320), a SAS solid state drive unit (e.g., 315), and/or a GenZ PRAM device (e.g., 325).

The compute resource 330 can translate between the enclosure-specific protocol 235 and the corresponding device-specific protocols 340. Alternatively or in addition, the compute resource 330 can emulate, for a host enclosure (e.g., 102 of FIG. 1) using the enclosure-specific protocol 235, one or more behaviors of the one or more mixed-format mixed-protocol non-volatile memory units (e.g., 310, 315, 320, and 325).

For example, the compute resource 330 can present the storage devices attached to the compute resource 330 as separate, individually identifiable, usable and/or manageable storage resources to a host compute server or storage enclosure (e.g., 102 of FIG. 1) as if the devices supported the native bay protocol(s) (e.g., SAS, SATA, PCIe, Ethernet, or the like, or the storage protocol otherwise expected by the software in the host computer system (e.g., AHCI, NVMe, or the like). In the event that the protocol of the storage device(s) within the adapter 305 differ from the native bay protocol(s), the compute resource 330 can provide translation between the protocol(s) provided by the storage device (s) and the native bay protocols of the compute server or storage enclosure (e.g., 102 of FIG. 1). In some embodiments, the host computer or enclosure (e.g., 102 of FIG. 1) can choose to be aware of the multiple different protocols and/or memory types that are incorporated within the adapter 305.

The compute resource 330 can present a selected subset (e.g., 310 and 315; 310, 315, and 320; 310 and 325; 310, 320, and 325; or any suitable combination of some or all of 310, 315, 320, and 325) of the one or more mixed-format mixed-protocol non-volatile memory units (e.g., 310, 315, 320, and 325) as a single virtualized device accessible to a host enclosure (e.g., 102 of FIG. 1) via the enclosure-specific protocol 235. In some embodiments, the compute resource 330 can present all of the one or more mixed-format mixed-protocol non-volatile memory units (e.g., 310, 315, 320, and 325) as a single virtualized device accessible to the host enclosure (e.g., 102 of FIG. 1) via the enclosure-specific protocol 235.

For example, the compute resource 330 can present all or a selected subset of the memory and storage attached to the compute resource 330 as one or more virtualized devices accessible through a standard host driver for the native bay protocols (e.g., SAS, SATA, PCIe, Ethernet, or the like) supported by a compute server or storage enclosure (e.g., 102 of FIG. 1). The host computer or enclosure (e.g., 102 of FIG. 1) need not be aware that other protocols or memory types are incorporated within the adapter 305.

In some embodiments, the virtualized devices presented by the adapter 305 can provide additional data management services to the host enclosure (e.g., 102 of FIG. 1) provided by the compute resource 330, such as data protection (e.g., RAID1, RAID 10, RAID 5, RAID 6, or the like) with replication of data across the multiple physical storage devices within the adapter 305. Alternatively or in addition, the compute resource 330 can provide point-in-time snapshots, with or without the ability to perform a rollback to a particular snapshot.

Moreover, the compute resource 330 can provide data encryption, data compression, and/or deduplication of data across some or all of the memory and storage devices attached to the compute resource 330. In addition, the compute resource 330 can provide data replication across similar adapter devices. The compute resource 330 can provide automated tiering of data between memory and storage devices of varying speeds attached to the compute resource 330. The compute resource 330 can provide various computation services across a subset of stored data. In some embodiments, the compute resource 330 can perform at least one of data encryption, data protection, data compression, or data deduplication on data stored on the one or more mixed-format mixed-protocol non-volatile memory units (e.g., 310, 315, 320, and 325).

Figure 4:
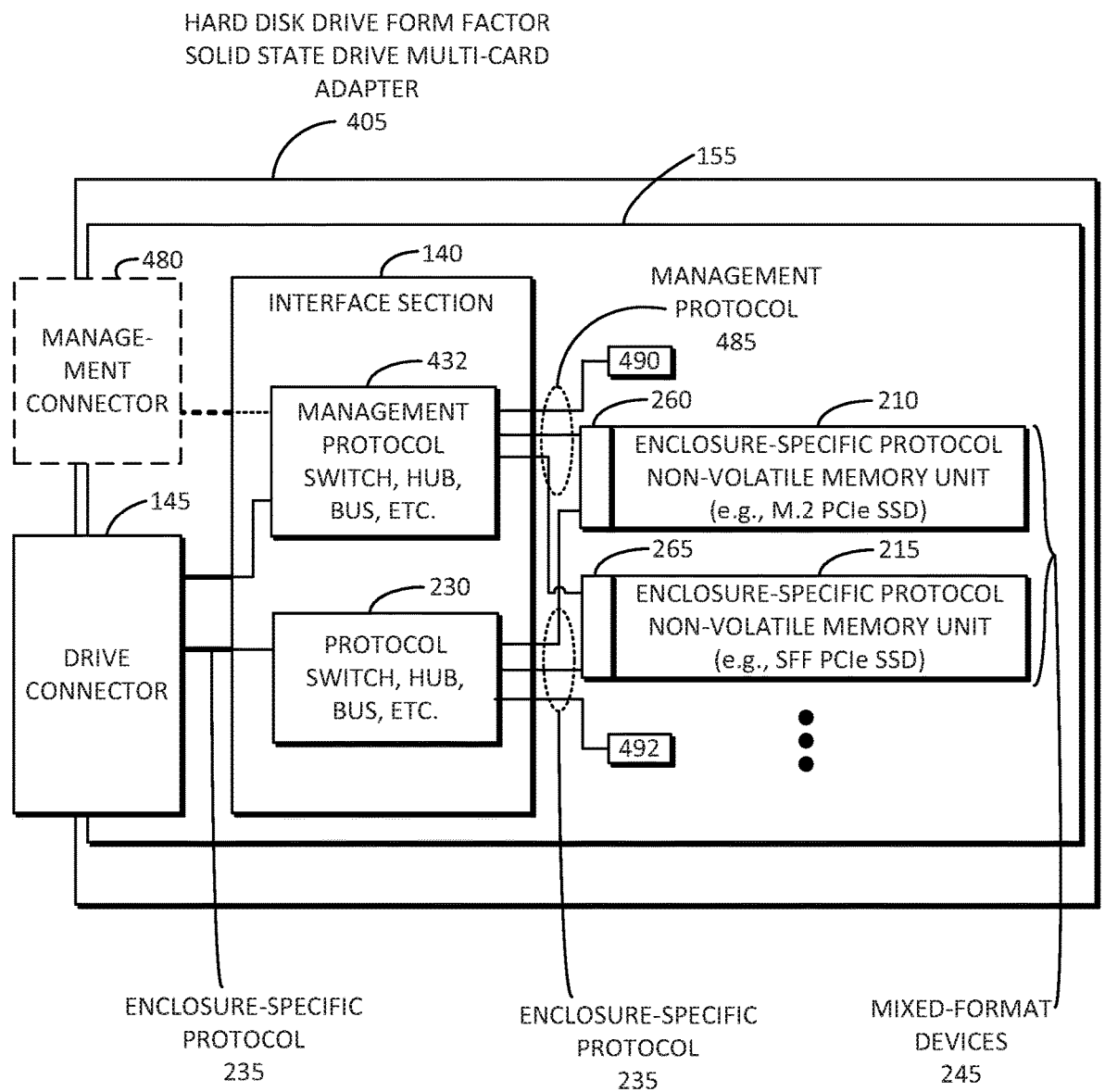
FIG. 4 is an example block diagram of an SSD multi-card adapter including a management connector and mixed-format devices in accordance with embodiments of the inventive concept.

FIG. 4 is an example block diagram of an SSD multi-card adapter 405 including a management connector 480 and mixed-format devices 245 in accordance with embodiments of the inventive concept. Some of the elements illustrated in FIG. 4 are described above, and therefore, a detailed description is not repeated.

The interface section 140 can aggregate management information. For example, the interface section 140 can include a management protocol switch, hub, and/or bus 432, generally referred to herein as a management protocol switch 432. The management protocol switch 432 can aggregate and route management information via a management protocol 485. The adapter 405 can include one or more thermal sensors (e.g., 490 and 492). The management information can include thermal data from the one or more thermal sensors (e.g., 490 and 492). The interface section 140 can communicate the thermal data from the one or more thermal sensors (e.g., 490 and 492) to a host enclosure (e.g., 102 of FIG. 1).

In some embodiments, the management connector 480 is separate from the connector 145. The interface section 140 can communicate, using the management switch 432 for example, the management information in an out-of-band fashion via the management connector 480. In other words, the management information can be communicated through a path that is separate from the data communication path (i.e., "out-of-band" communication).

The adapter 405 can provide an aggregation mechanism for the management data that is independent from the aggregation mechanism for stored and retrieved data (i.e., "user data"). Such aggregation mechanism can be carried out using a protocol switch, hub, bus, (e.g., 432) or the like, as appropriate to the management protocol. The aggregation mechanism can also be carried out by way of a dedicated processor, ASIC, FPGA resource, or the like. The management data can be communicated out of the adapter 405 through the primary data connector 145, or alternatively, through a separate connector 480 for management of other non-user data communication.

The aggregation mechanism within the adapter 405 can proactively react to the physical state of the device(s) without any changes to the host server system or host enclosure (e.g., 102 of FIG. 1). For example, the aggregation mechanism can reduce the speed of the storage devices (e.g., 210 and 215) when thermal sensors indicate a higher operating temperature, or a temperature that exceeds a predefined threshold. In some embodiments, the aggregation mechanism can isolate a faulty device from among the mixed-format devices (e.g., 245) without affecting the other devices associated with the adapter 405.

Figure 5:
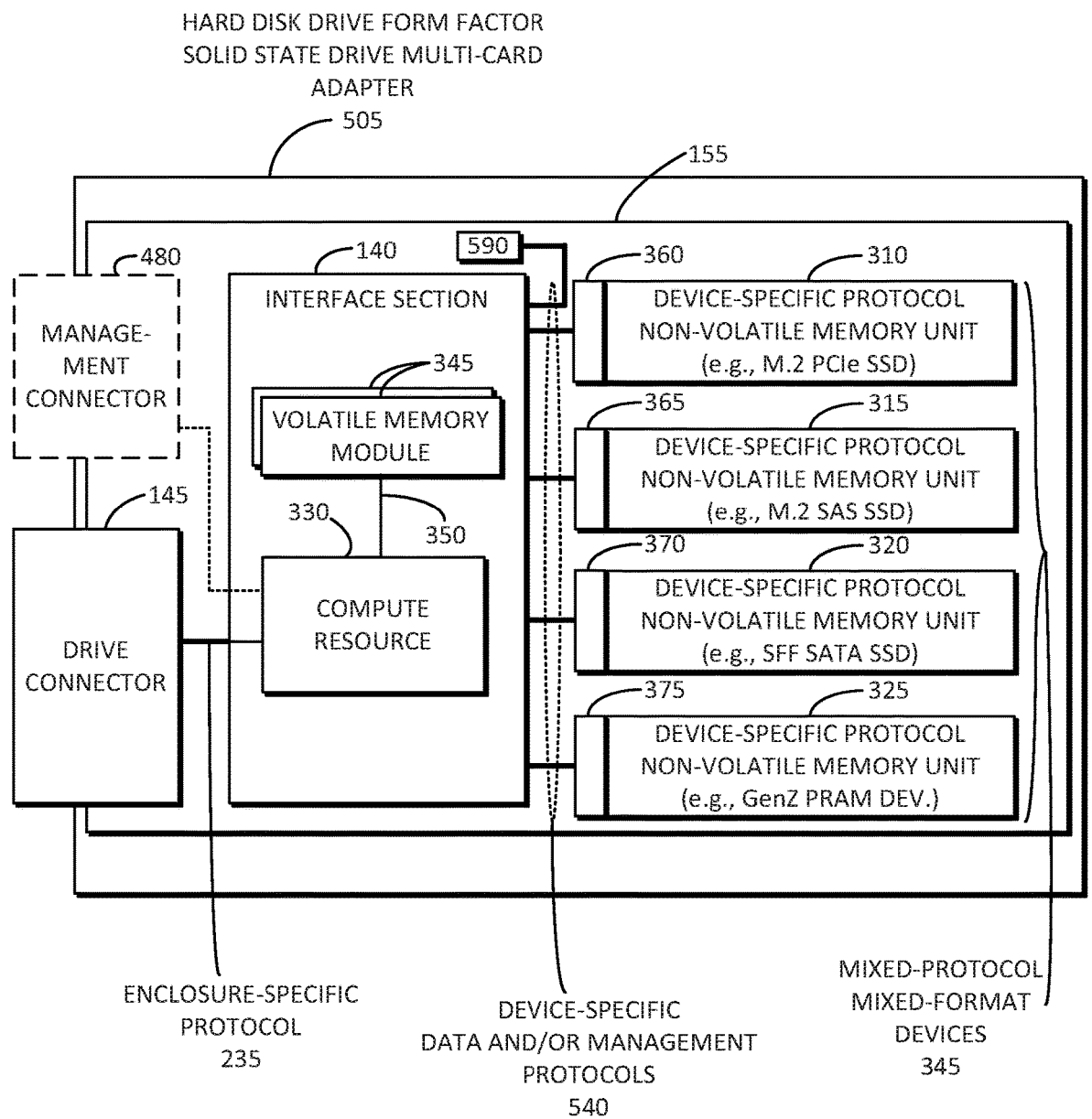
FIG. 5 is an example block diagram of an SSD multi-card adapter including a management connector and mixed-protocol mixed-format devices in accordance with embodiments of the inventive concept.

FIG. 5 is an example block diagram of an SSD multi-card adapter 505 including a management connector 480 and mixed-protocol mixed-format devices 355 in accordance with embodiments of the inventive concept. Some of the elements illustrated in FIG. 5 are described above, and therefore, a detailed description is not repeated.

The interface section 140 can aggregate management information. For example, the interface section 140 can include the compute resource 330, which can be coupled to the volatile memory module(s) 345 via line 350. The compute resource 330 can aggregate and route management information in-band via device-specific and/or management protocols 540. The adapter 505 can include one or more thermal sensors (e.g., 590). The management information can include thermal data from the one or more thermal sensors (e.g., 590). The interface section 140 can communicate the thermal data from the one or more thermal sensors (e.g., 590) to a host enclosure (e.g., 102 of FIG. 1).

In some embodiments, the management connector 480 is separate from the connector 145. The interface section 140 can communicate, using the compute resource 330, for example, the management information in an in-band fashion via the management connector 480. In other words, the management information can be communicated through a path that is the same as the data communication path (i.e., "in-band" communication) between the mixed-format mixed-protocol devices 355 and the compute resource 330, and then communicated to the host enclosure (e.g., 102 of FIG. 1) via either the management connector 480 or the connector 145. In this manner, the management information can be aggregated.

Such aggregation mechanism can be carried out using the compute resource 330. The aggregation mechanism can also be carried out by way of a dedicated processor, ASIC, FPGA resource, or the like. The management data can be communicated out of the adapter 505 through the primary data connector 145, or alternatively, through a separate connector 480 for management of other non-user data communication.

The aggregation mechanism within the adapter 505 can proactively react to the physical state of the device(s) without any changes to the host server system or host enclosure (e.g., 102 of FIG. 1). For example, the aggregation mechanism can reduce the speed of the storage devices (e.g., 310, 315, 320, and 325) when thermal sensor(s) (e.g., 590) indicate a higher operating temperature, or a temperature that exceeds a predefined threshold. In some embodiments, the aggregation mechanism can isolate a faulty device from among the mixed-format mixed-protocol devices (e.g., 355) without affecting the other devices associated with the adapter 505. For example, the management information gathered via the aggregation mechanism can identify one or more faulty devices from among the mixed-format mixed-protocol devices (e.g., 355).

In some embodiments, the management information can be communicated through the data communication interface (i.e., "in-band" communication). For example, the compute resource 330 or other suitable integrated protocol aggregation resource can serve as the aggregation mechanism for the management data as well as for the user data. When the adapter 505 provides a separate connector (e.g., 480) for the communication of management data, as may be compatible with the compute server or storage enclosure (e.g., 102 of FIG. 1), the aggregation resource for user data, such as the compute resource 330, can aggregate the management data from the various mixed-protocol devices 355 within the adapter 505 and present the aggregated data to a separate management connector (e.g., 480). A protocol for out-of-band communication of the management data can be determined by the compute server or storage enclosure (e.g., 102 of FIG. 1).

Figure 6A:
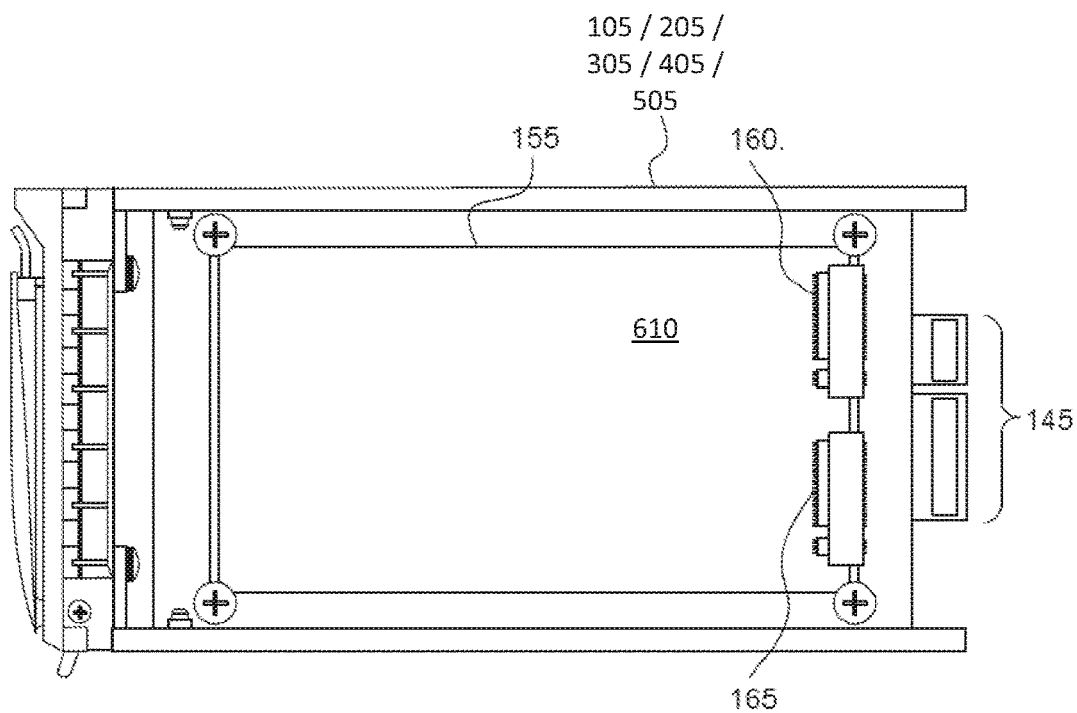
FIG. 6A is an example left side elevation view of some components of the SSD multi-card adapter of FIG. 1 in accordance with embodiments of the inventive concept.
Figure 6B:
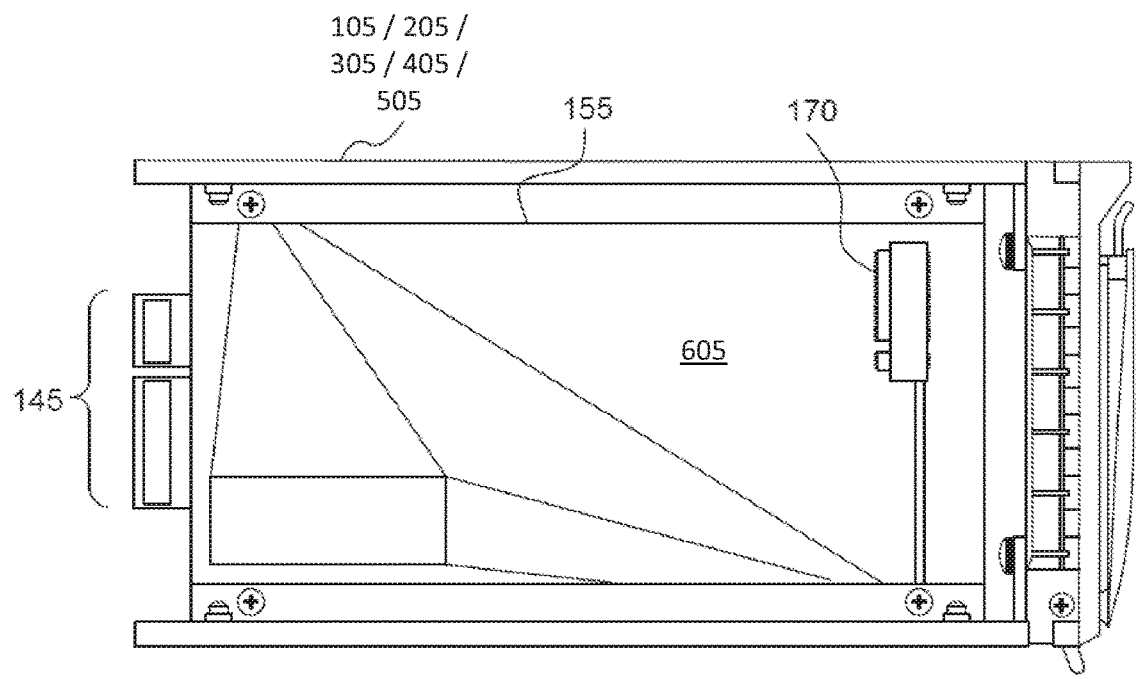
FIG. 6B is an example right side elevation view of some components of the SSD multi-card adapter of FIG. 1 in accordance with embodiments of the inventive concept.

FIG. 6A is an example left side elevation view of some components of the SSD multi-card adapter 105 of FIG. 1 in accordance with embodiments of the inventive concept. FIG. 6B is an example right side elevation view of some components of the SSD multi-card adapter 105 of FIG. 1 in accordance with embodiments of the inventive concept. It will be understood that while reference is made to the adapter 105 of FIG. 1, the inventive concepts illustrated in FIGS. 6A and 6B are applicable to the adapters 205, 305, 405, and 505, as disclosed herein. Some of the elements illustrated in FIGS. 6A and 6B are described above, and therefore, a detailed description is not repeated. Reference is now made to FIGS. 6A and 6B, which show opposite sides of an example embodiment.

The SSD adapter 105 (and/or 205, 305, 405, and 505) can include a first solid state drive connector 170, which can be coupled to a first surface 605 of the circuit board 155, as shown in FIG. 6B. The SSD adapter 105 can include a second solid state drive connector 160, which can be coupled to a second surface 610 of the circuit board 155 that is opposite the first surface 605 of the circuit board 155, as shown in FIG. 2A. The SSD adapter 105 can include a third solid state drive connector 165, which can be coupled to the second surface 610 of the circuit board 155 that is opposite the first surface 605 of the circuit board, as shown in FIG. 2A.

Figure 7:
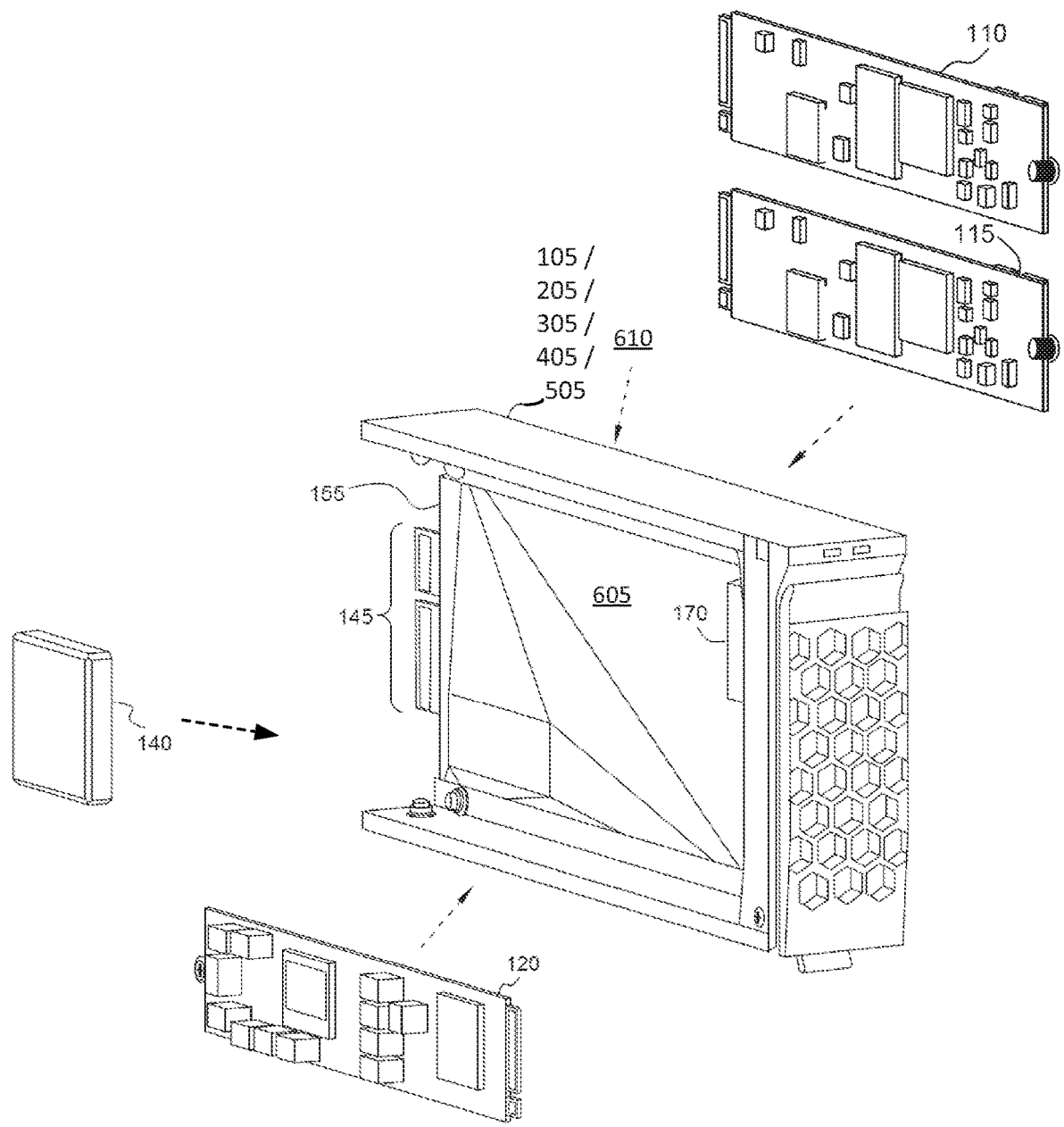
FIG. 7 is an example perspective view of some components of the SSD multi-card adapter of FIG. 1 in accordance with embodiments of the inventive concept.

FIG. 7 is an example perspective view of some components of the SSD multi-card adapter of FIG. 1 in accordance with embodiments of the inventive concept. The SSD adapter 105 (and/or 205, 305, 405, and 505) can include a first solid state drive card 120, which can be seated in the first solid state drive connector 170 that is coupled to the first surface 605 of the circuit board 155. The SSD adapter 105 can include the interface section 140, which can be coupled to the first surface 605 of the circuit board 155. Some of the elements illustrated in FIG. 7 are described above, and therefore, a detailed description is not repeated.

The SSD adapter 105 can include a second solid state drive card 110, which can be seated in the second solid state drive connector 160 (of FIG. 6) that is coupled to the second surface 610 of the circuit board 155. The SSD adapter 105 can include a third solid state drive card 115, which can be seated in the third solid state drive connector 165 (of FIG. 6) that is coupled to the second surface 610 of the circuit board 155.

Figure 8A:
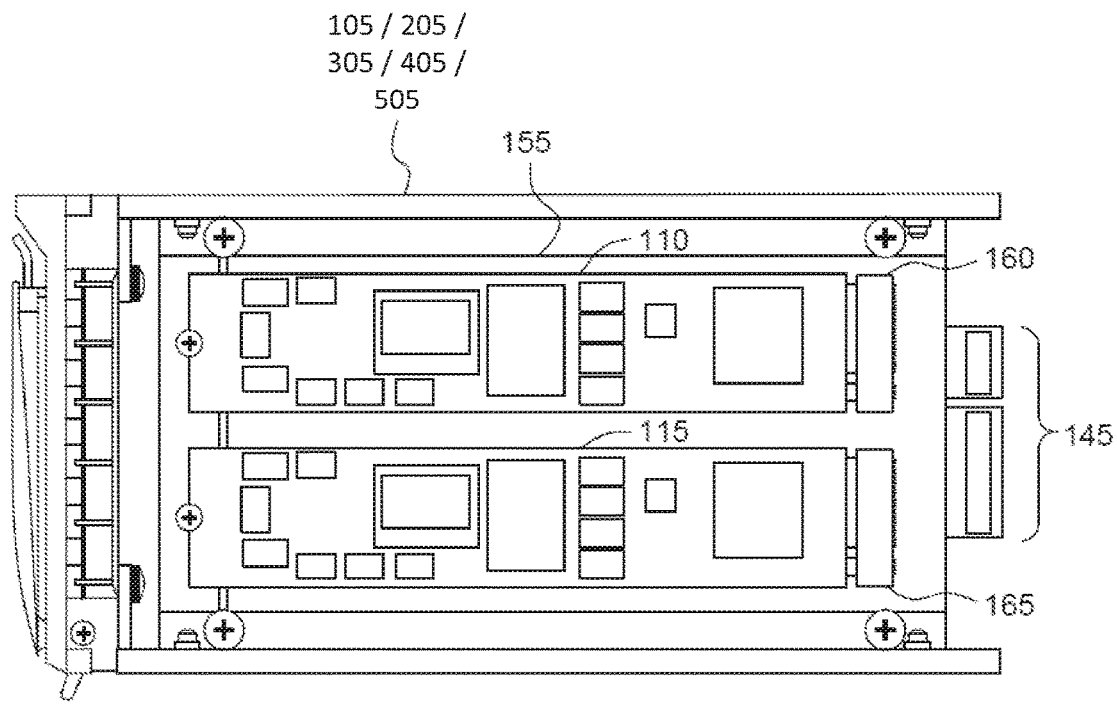
FIG. 8A is an example left side elevation view of some components of the SSD multi-card adapter of FIG. 1 in accordance with embodiments of the inventive concept.
Figure 8B:
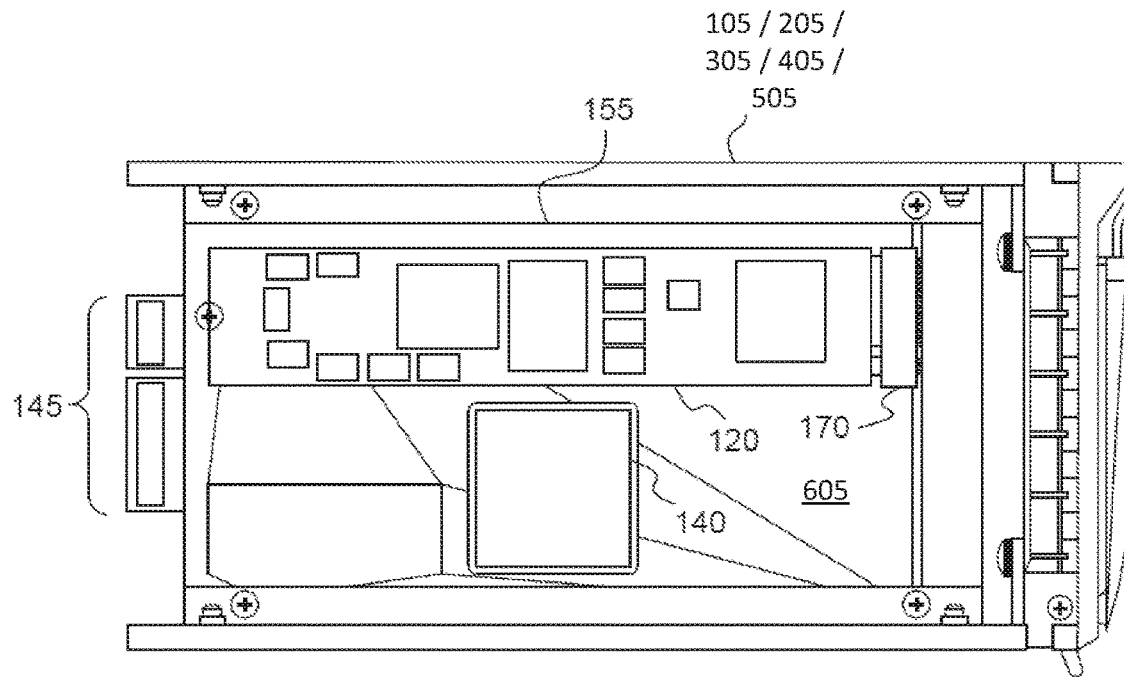
FIG. 8B is an example right side elevation view of some components of the SSD multi-card adapter of FIG. 1 in accordance with embodiments of the inventive concept.

FIG. 8A is an example left side elevation view of some components of the SSD multi-card adapter of FIG. 1 in accordance with embodiments of the inventive concept. FIG. 8B is an example right side elevation view of some components of the SSD multi-card adapter of FIG. 1 in accordance with embodiments of the inventive concept. Some of the elements illustrated in FIGS. 8A and 8B are described above, and therefore, a detailed description is not repeated. Reference is now made to FIGS. 8A and 8B.

The interface section 140 can be coupled to the first surface 605 of the circuit board 155. The interface section 140 can be electrically coupled to any or all of the first solid state drive card 120, electrically coupled to the second solid state drive card 110, and electrically coupled to the third solid state drive card 115, and to the connector 145. The interface section 140 can expand an upstream port to a multiple downstream ports, as further described in detail below. Each downstream port can be associated with a corresponding one of the first solid state drive card 120, the second solid state drive card 110, and the third solid state drive card 115.

In some embodiments, the circuit board 155, the interface section 140, the first solid state drive card 120, the second solid state drive card 110, the third solid state drive card 115, the first solid state drive connector 170, the second solid state drive connector 160, the third solid state drive connector 165, and the connector 145 can substantially fit within a hard disk drive form factor.

The example SSD multi-card adapter 105 herein can include a plurality solid state drive cards. In other words, a user can choose how many solid state drive cards to insert into the solid state drive connectors. For example, if the user does not need as much storage density, then a single solid state drive card (e.g., 120) can be inserted into the corresponding solid state drive connector (e.g., 170), and the other two solid state drive connectors (e.g., 160 and 165) need not be occupied by a solid state drive card. Conversely, if the user requires additional storage density, or wishes to upgrade the amount of storage density at a later time, then one or two more solid state drive cards (e.g., 110 and 115) can be added to the multi-card adapter 105 and seated within the corresponding solid state drive connectors (e.g., 160 and 165).

Figure 9:
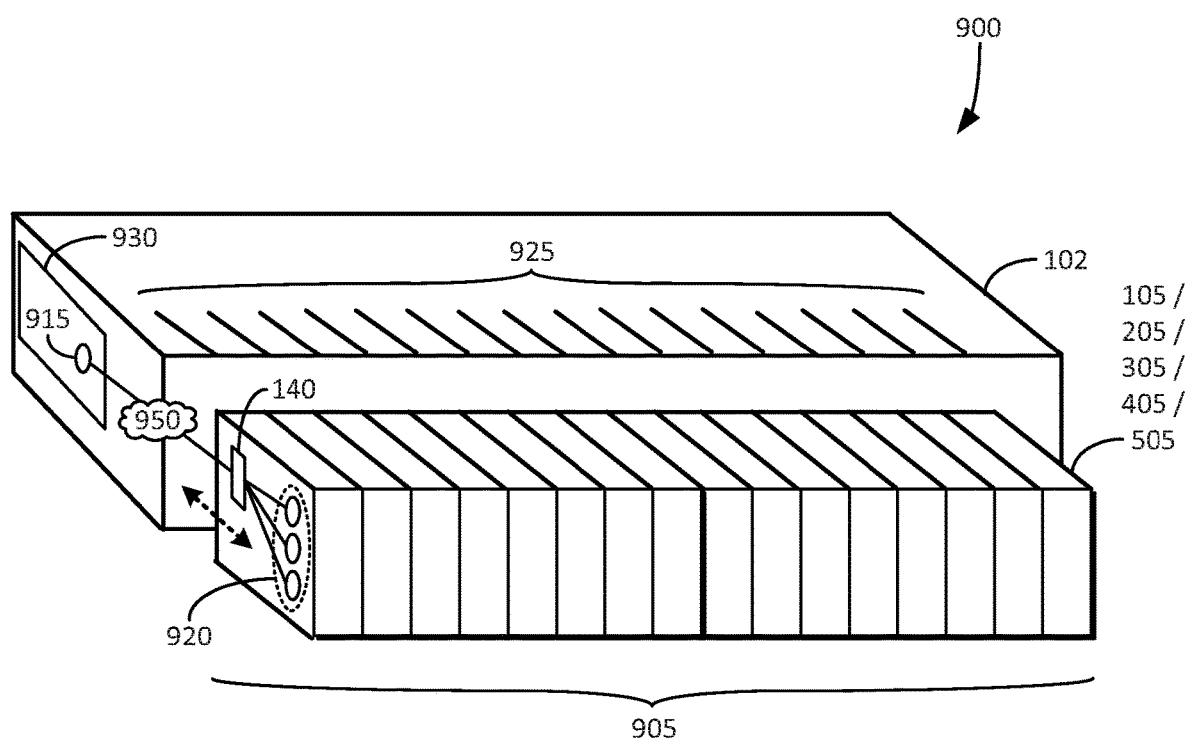
FIG. 9 is an example perspective view of an example block diagram of a computer server system including hard disk drive form factor drive bays and SSD multi-card adapters in accordance with embodiments of the inventive concept.

FIG. 9 is an example perspective view of an example block diagram of a computer server system 900 including hard disk drive form factor drive bays 925 and SSD multi-card adapters 905 in accordance with embodiments of the inventive concept. The server system 900 can include an enclosure 102. The server system 900 can include the hard disk drive form factor drive bays 925 either internally or externally relative to the enclosure 102. Although the drive bays 925 are shown in an upright orientation, it will be understood that the drive bays 925 can be arranged in other orientations such as a horizontal orientation such that they can receive the SSD multi-card adapters 905 in a horizontal drive placement manner. Alternatively or in addition, the drive bays 925 can have a toaster-like orientation such that they can receive the SSD multi-card adapters 905 in a toaster-like manner. Alternatively or in addition, the enclosure 102 can be a multi-slot width SSD enclosure, which allows for more dense SSD packing than single-width enclosures, since the walls between slots can be removed. In other words, each drive bay 925 can accommodate an SSD multi-card adapter 905 that has a width that is proportional, for example, to two or more hard disk drive form factor drive adapters, and which can accommodate greater a density of solid state drive cards.

The server system 900 can include multiple SSD multi-card adapters 905, which can be seated within the drive bays 925. In some embodiments, the server system 900 or other suitable peripheral enclosure can provide a proscribed amount of data connectivity, management connectivity, power capacity, and/or thermal capacity to each drive bay (e.g., 925). Each of the SSD adapters 905 can have multiple solid state drive cards, as described above. The computer server system 900 can include a motherboard 930. The motherboard 930 can include multiple upstream ports, such as upstream port 915. The upstream ports can be, for example, PCIe ports such as PCIe X4 upstream ports, Ethernet ports, Universal Serial Bus (USB) ports, Fibre Channel ports, or the like. Each of the SSD multi-card adapters 905 can include multiple downstream ports 920. Each of the downstream ports 920 can be a PCIe X4 downstream port, for example.

Moreover, in the present example each of the downstream ports 920 can be associated with a corresponding one of the plurality of solid state drives (e.g., 110, 115, 120 of FIG. 1). The interface section 140 of each of the SSD multi-card adapters 905 can expand an upstream port (e.g., 915) to multiple downstream ports (e.g., 920) by replicating and/or distributing information from the upstream port (e.g., 915) to the multiple downstream ports (e.g., 920). Put differently, information 950 received from the upstream port 915 can be stored on at least one of the plurality of solid state drives via the downstream ports 920. In other words, the interface section 140 can fan out one upstream port to multiple downstream ports. In this manner, the storage capacity density can be increased.

Each SSD adapter 905 allows one or more storage devices of a different form factor (e.g., solid state drive cards 110, 115, and 120 of FIG. 1) to be integrated into existing computer servers and/or storage enclosure platforms, such as the server system 900. Such systems can provide space, power, cooling, and connectivity for storage devices that conform to a standard form factor. Examples can include industry standard LFF 3.5 inch storage devices and/or SFF 2.5 inch storage devices that are supported in matching drive bays on most modern computer servers. Additional examples include enclosure-standard drive bays such as a "cartridge" form factor. Alternatively or in addition, the storage device(s) such as the solid state drive cards (e.g., 110, 115, 120 of FIG. 1) can conform to a standard defined by the server enclosure or peripheral enclosure to allow a given device to operate in any one of a plurality of drive bays (e.g., 925) within a single system type and/or operate interchangeably in drive bays (e.g., 925) of other systems of that same type. For example, the storage device(s) such as the solid state drive cards (e.g., 110, 115, 120 of FIG. 1) can conform to a chassis standard to emulate expected physical characteristics such as electrical and thermal qualities. Alternatively or in addition, the storage device(s) such as the solid state drive cards (e.g., 110, 115, 120 of FIG. 1) can conform to one or more connectivity-related standards such as how the internal components work or communicate one with another. Alternatively or in addition, the storage device(s) such as the solid state drive cards (e.g., 110, 115, 120 of FIG. 1) can conform to any suitable existing or new standard.

In some embodiments, the standard form factor devices that the adapter 905 is designed to physically match in form factor and connectivity, and the like, can provide connectivity sufficient for a single device (e.g., 110 of FIG. 1) between that single device and the communications infrastructure within the host computer server 900 or other suitable storage enclosure. The single device (e.g., 110 of FIG. 1) can have more than one data connection if the communication infrastructure within the host computer server 900 or storage enclosure provides for multiple data paths, such as for dual-headed serial attached SCSI (SAS) drives.

Figure 10A:
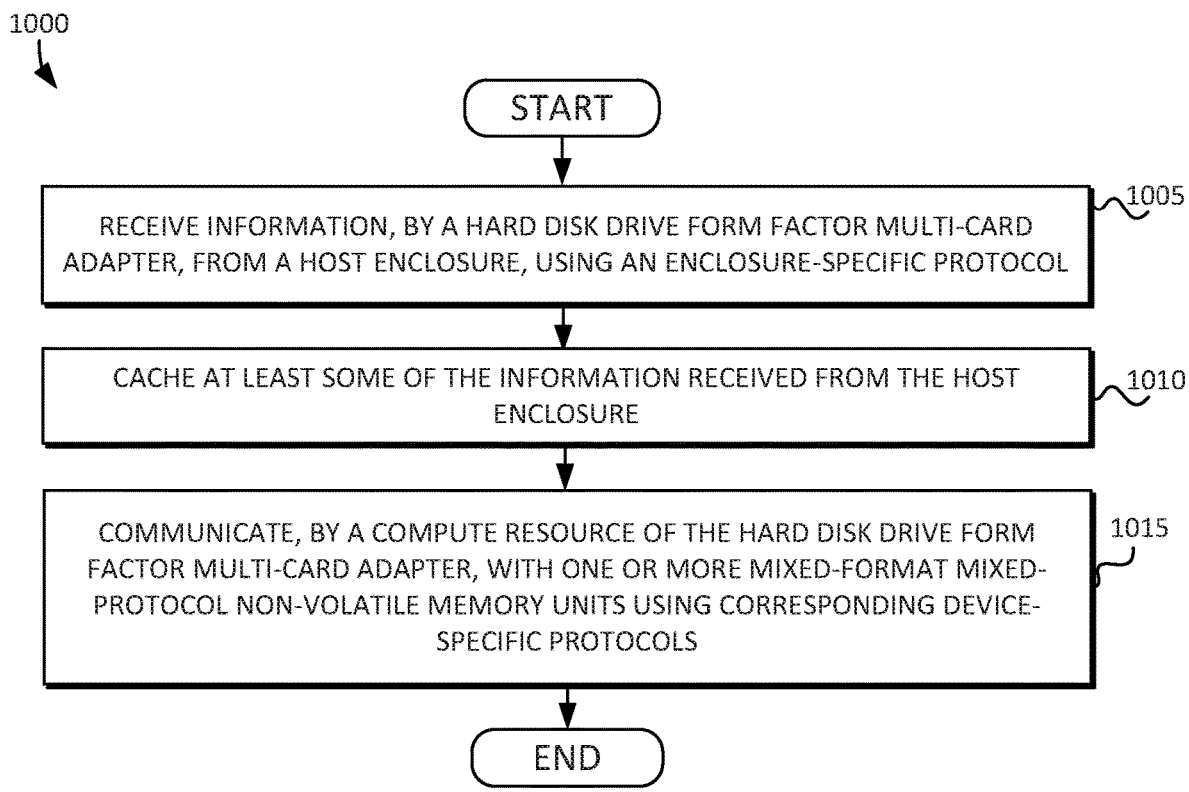
FIG. 10A illustrates a flow diagram including a technique for communicating with mixed-format mixed-protocol non-volatile memory units within an SSD multi-card adapter in accordance with embodiments of the inventive concept.

FIG. 10A illustrates a flow diagram 1000 including a technique for communicating with mixed-format mixed-protocol non-volatile memory units within an SSD multi-card adapter in accordance with embodiments of the inventive concept. The technique can begin at 1005, where information can be received, by an SSD multi-card adapter (e.g., 105, 205, 305, 405, and 505 described above), from a host enclosure (e.g., 102 of FIG. 1), using an enclosure-specific protocol (e.g., 235 of FIG. 2). At 1010, at least some of the information received from the host enclosure can be cached, for example, in volatile memory units (e.g., 345 of FIG. 3) associated with a compute resource (e.g., 330 of FIG. 3). At 1015, the compute resource (e.g., 330 of FIG. 3) can communicate with one or more mixed-format mixed-protocol non-volatile memory units (e.g., 345 of FIG. 3) using corresponding device-specific protocols (e.g., 340 of FIG. 3).

Figure 10B:
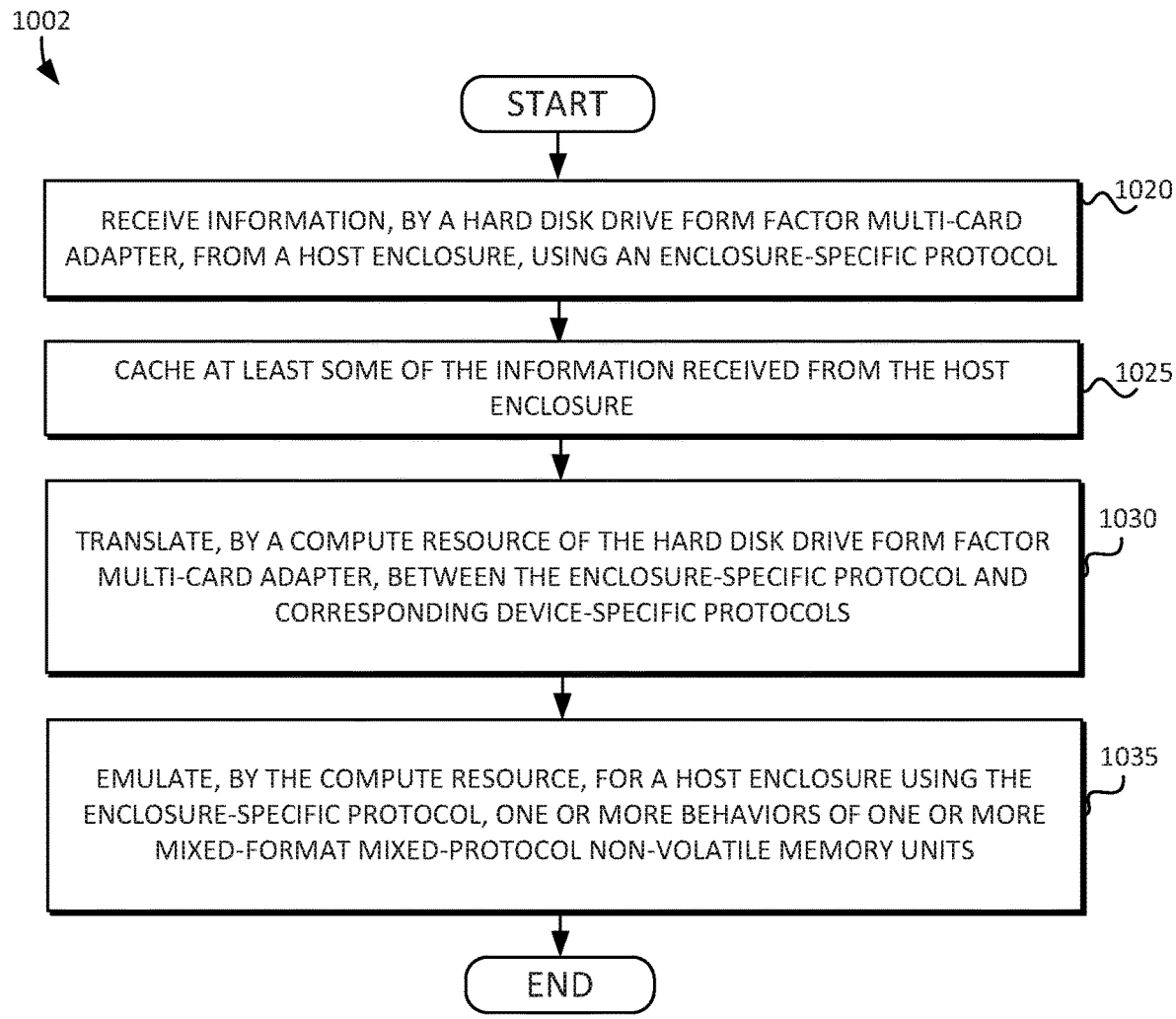
FIG. 10B illustrates a flow diagram including a technique for translating protocols and emulating storage device behaviors in accordance with embodiments of the inventive concept.

FIG. 10B illustrates a flow diagram 1002 including a technique for translating protocols and emulating storage device behaviors in accordance with embodiments of the inventive concept. The technique can begin at 1020, where information can be received, by an SSD multi-card adapter (e.g., 105, 205, 305, 405, and 505 described above), from a host enclosure (e.g., 102 of FIG. 1), using an enclosure-specific protocol (e.g., 235 of FIG. 2). At 1025, at least some of the information received from the host enclosure can be cached, for example, in volatile memory units (e.g., 345 of FIG. 3) of a compute resource (e.g., 330 of FIG. 3). At 1030, the compute resource (e.g., 330 of FIG. 3) can translate between the enclosure-specific protocol (e.g., 235 of FIG. 2) and corresponding device-specific protocols (e.g., 340 of FIG. 3). In other words, the compute resource (e.g., 330 of FIG. 3) can translate commands or data that conform to one particular enclosure-specific protocol (e.g., 235 of FIG. 2) such that the commands or data are adapted to or are otherwise made compatible with one or more device-specific protocols (e.g., 340 of FIG. 3). Put differently, the enclosure can be agnostic to the particular device-specific protocols, and can operate in accordance with its own enclosure-specific protocol without needing to know about the particular device-specific protocols or translation occurring within the multi-card adapters. At 1035, the compute resource (e.g., 330 of FIG. 3) can emulate, for a host enclosure (e.g., 102 of FIG. 1) using the enclosure-specific protocol (e.g., 235 of FIG. 2), one or more behaviors of one or more mixed-format mixed-protocol non-volatile memory units (e.g., 345 of FIG. 3).

Figure 10C:
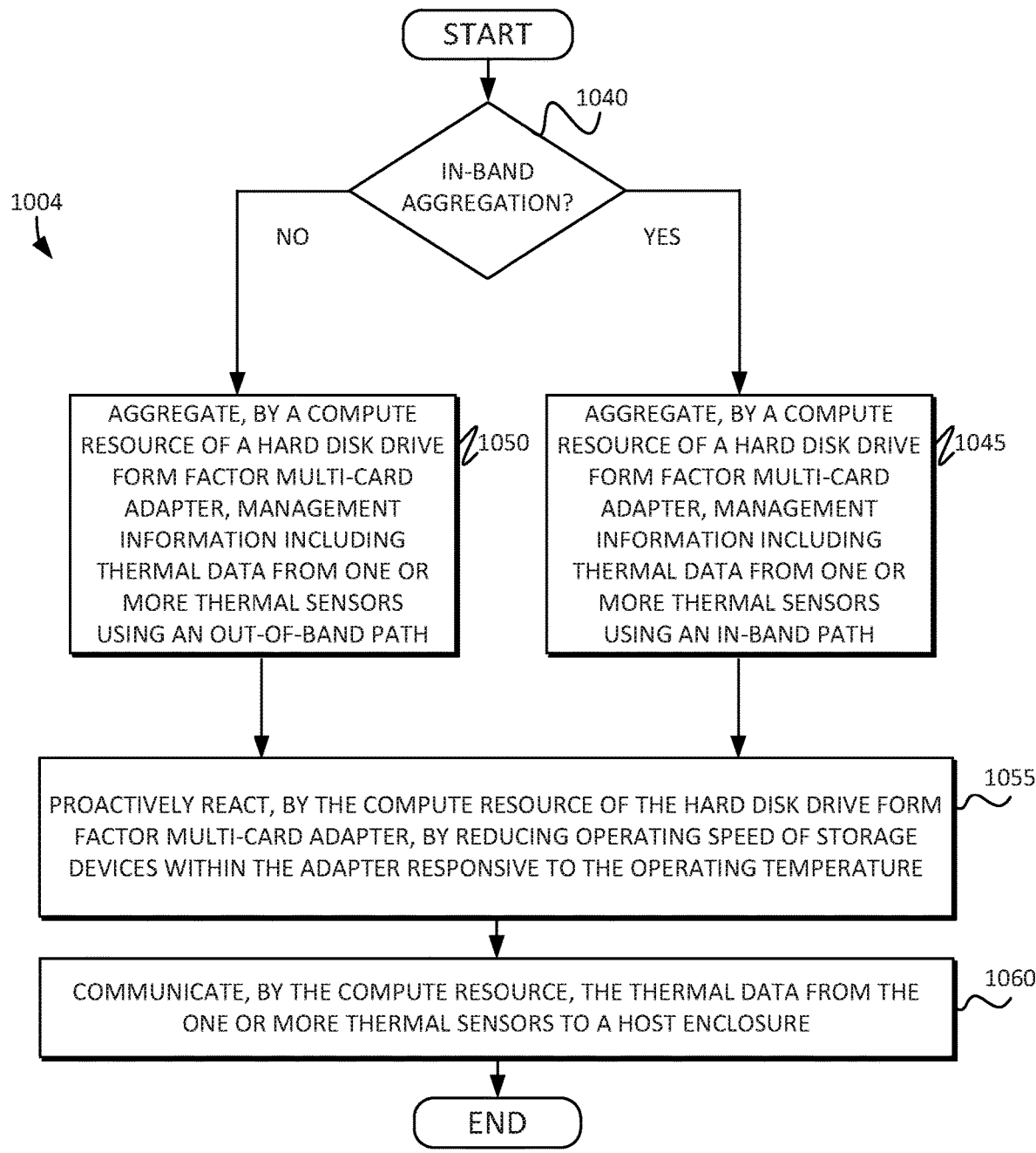
FIG. 10C illustrates a flow diagram including a technique for aggregating management information in accordance with embodiments of the inventive concept.

FIG. 10C illustrates a flow diagram 1004 including a technique for aggregating management information in accordance with embodiments of the inventive concept. The technique can begin at 1040, where a determination can be made whether or not to aggregate management information in-band. If YES, the flow can proceed to 1045, where management information can be aggregated, by a compute resource (e.g., 330 of FIG. 3) of an SSD multi-card adapter (e.g., 105, 205, 305, 405, and 505) using an in-band path. The management information can include, for example, thermal data from one or more thermal sensors (e.g., 490 and 492 of FIG. 4). Otherwise, if NO, the flow can proceed to 1050 for out-of-band aggregation. At 1050, the management information can be aggregated, by the compute resource (e.g., 330 of FIG. 3) of the SSD multi-card adapter (e.g., 105, 205, 305, 405, and 505) using an out-of-band path. At 1055, the compute resource (e.g., 330 of FIG. 3) can proactively react to the thermal data by reducing the operating speed of storage devices (e.g., 245 of FIG. 2, 355 of FIG. 3, or the like) within the adapter (e.g., 105, 205, 305, 405, and 505) responsive to the operating temperature. At 1060, the compute resource (e.g., 330 of FIG. 3) can communicate the thermal data from the one or more thermal sensors (e.g., 490 and 492 of FIG. 4) to a host enclosure (e.g., 102 of FIG. 1).

It will be understood that the steps illustrated in FIGS. 10A through 10C need not occur in the order described, but rather, can occur in a different order and/or with intervening steps.

Figure 11:
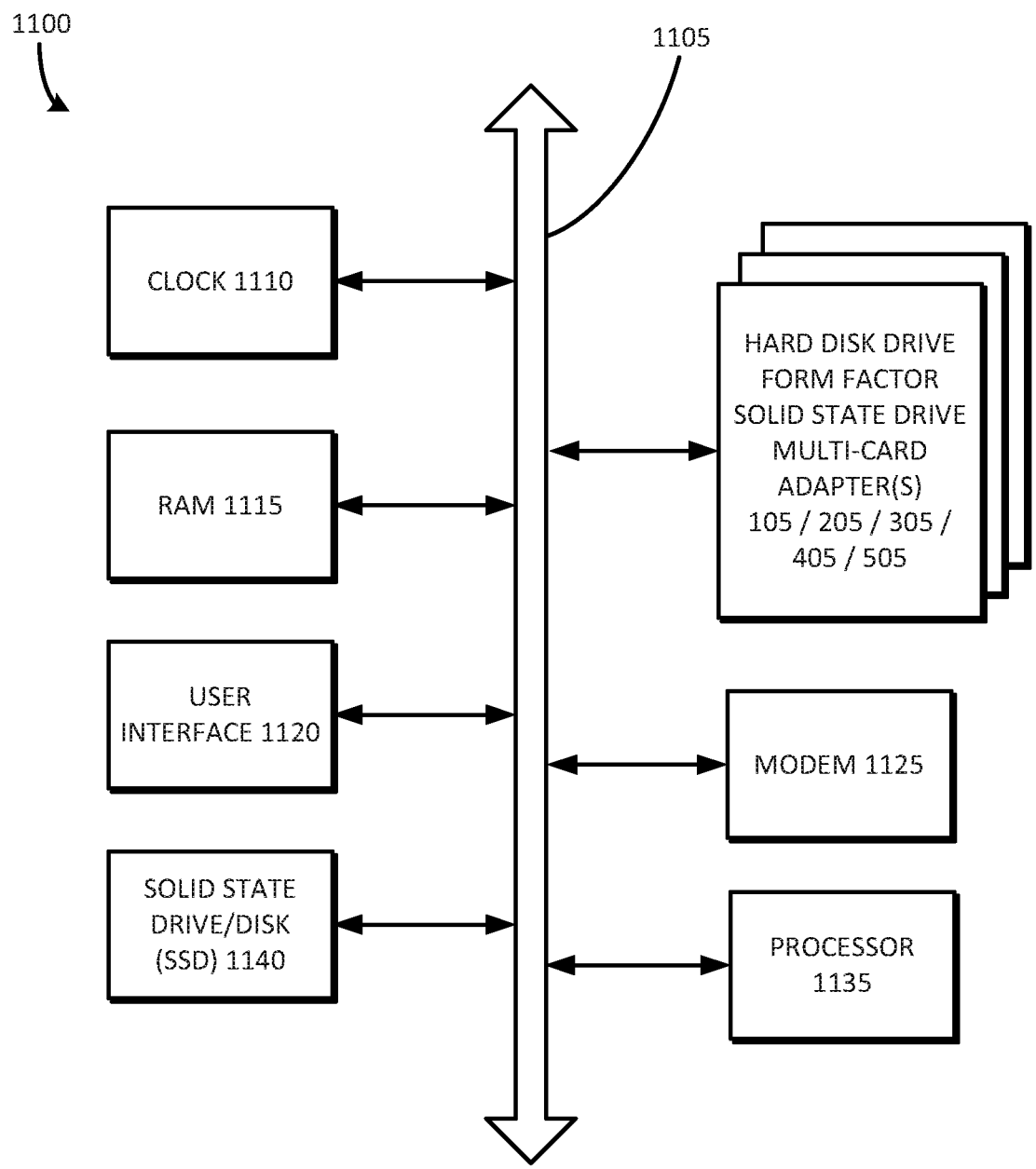
FIG. 11 is a block diagram of a computing system including the SSD multi-card adapter(s) of FIG. 1.

FIG. 11 is a block diagram of a computing system 1100 including the SSD multi-card adapter(s) (e.g., 105, 205, 305, 405, and 505) of FIGS. 1 through 9 described above. The computing system 1100 can include a clock 1110, a random access memory (RAM) 1115, a user interface 1120, a modem 1125 such as a baseband chipset, a solid state drive/disk (SSD) 1140, and/or a processor 1135, any or all of which may be electrically coupled to a system bus 1105. The system bus 1105 can be a high-speed bus and/or fabric. The SSD multi-card adapter(s) (e.g., 105, 205, 305, 405, and 505) can correspond to those described in detail above, and as set forth herein, and may also be electrically coupled to the system bus 1105. The SSD multi-card adapter(s) can include or otherwise interface with the clock 1110, the random access memory (RAM) 1115, the user interface 1120, the modem 1125, the solid state drive/disk (SSD) 1140, and/or the processor 1135.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A device, comprising:
    a first connector configured to support a storage communication protocol;
    an interface section coupled to the first connector;
    two or more second connectors coupled to the interface section, the two or more second connectors being configured to support at least a first storage protocol and a second storage protocol different from the first storage protocol; and
    a compute resource including a field programmable gate array (FPGA) in communication with and connected to one or more solid state storage devices and the interface section,
    wherein at least one of the interface section or the one or more solid state storage devices is configured to offload at least one operation in association with storing data onto the one or more solid state storage devices, to the compute resource such that the compute resource is configured to perform a first operation from among data encryption, data protection, data compression, or data deduplication on the data configured for storage onto the one or more solid state storage devices at a first period, and wherein the FPGA of the compute resource is configured to be reconfigured, and to perform a second reconfigured operation different from the first operation from among the data encryption, the data protection, the data compression, or the data deduplication on the data configured for storage onto the one or more solid state storage devices at a second period.

2. The device of claim 1, wherein at least one of the interface section or the one or more solid state storage devices is configured to offload at least one operation in association with reading data from the one or more solid state storage devices, to the compute resource such that the compute resource performs one or more operations associated with at least one of data encryption, data protection, data decompression, or data deduplication on the data configured to be read from the one or more solid state storage devices.

3. The device of claim 2, wherein the one or more solid state storage devices, the interface section, the two or more second connectors and the compute resource are enclosed within a same enclosure configured for connection via the first connector to a computing device.

4. The device of claim 1, wherein the interface section and the two or more second connectors are on a same surface of a circuit board.

5. The device of claim 1, wherein at least one of the first storage protocol or the second storage protocol include at least one of an Ethernet protocol, a serial ATA (SATA) protocol or a peripheral component interconnect express (PCIe) protocol.

6. The device of claim 1, wherein the interface section is accessible to a host device via an enclosure-specific protocol, the enclosure-specific protocol including at least one of an Ethernet protocol, a SATA protocol or a PCIe protocol.

7. The device of claim 1, further comprising one or more thermal sensors configured to provide thermal data, wherein the compute resource is configured to communicate with at least one memory unit using the one or more storage protocols.

8. The device of claim 1, wherein the compute resource is configured to aggregate management information, wherein the aggregated management information includes the thermal data, and wherein the interface section is configured to communicate the aggregated management information in at least one of an out-of-band fashion or an in-band fashion.

9. The device of claim 1, wherein the interface section includes at least one of a PCIe switch, a PCIe hub, a PCIe bus, an Ethernet switch, an Infiniband switch, a Fibre Channel switch, or other communication fabric component.

10. The device of claim 1, wherein the device is configured to be seated within one of a plurality of slots of a host device.

11. The device of claim 1, further comprising one or more memory elements, wherein the device is configured to present the one or more memory elements as a single virtualized device.

12. A device, comprising:
    a first connector configured to support a storage communication protocol;
    an interface section including a field programmable gate array (FPGA) coupled to the first connector; and
    two or more second connectors coupled to the interface section, the two or more second connectors being configured to support at least a first storage protocol and a second storage protocol different from the first storage protocol,
    wherein the interface section is in communication with and connected to one or more solid state storage devices;
    wherein at least one of the interface section or the one or more solid state storage devices is configured to offload at least one operation in association with storing data onto the one or more solid state storage devices, to the interface section such that the interface section is configured to perform a first operation from among data encryption, data protection, data compression, or data deduplication on the data configured for storage onto the one or more solid state storage devices at a first period, and wherein the FPGA of the interface section is configured to be reconfigured, and to perform a second reconfigured operation different from the first operation from among the data encryption, the data protection, the data compression, or the data deduplication on the data configured for storage onto the one or more solid state storage devices at a second period.

13. The device of claim 12, wherein at least one of the interface section or the one or more solid state storage devices is configured to offload at least one operation in association with reading data from the one or more solid state storage devices, to the interface section such that the interface section performs at least one of data encryption, data protection, data decompression, or data deduplication on the data configured to be read from the one or more solid state storage devices.

14. The device of claim 13, wherein the one or more solid state storage devices, the interface section, and the two or more second connectors are enclosed within a same enclosure configured for connection via the first connector to a computing device.

15. The device of claim 12, wherein the interface section comprises a compute resource, the compute resource being configured to:
perform one or more operations associated with the at least one of the data encryption, the data protection, the data decompression, or the data deduplication on the data configured to be read from the one or more solid state storage devices; and
perform the at least one of the data encryption, the data protection, the data compression, or the data deduplication on the data configured for storage onto the one or more solid state storage devices.

16. The device of claim 15, further comprising one or more thermal sensors configured to provide thermal data, wherein the compute resource is configured to communicate with at least one memory unit using the one or more storage protocols.

17. The device of claim 15, wherein the compute resource is configured to aggregate management information, wherein the aggregated management information includes the thermal data, and wherein the interface section is configured to communicate the aggregated management information in at least one of an out-of-band fashion or an in-band fashion.

18. The device of claim 12, wherein the interface section and the two or more second connectors are on a same surface of a circuit board.

19. The device of claim 12, wherein at least one of the first storage protocol or the second storage protocol include at least one of an Ethernet protocol, a serial ATA (SATA) protocol or a peripheral component interconnect express (PCIe) protocol.

20. The device of claim 12, wherein the interface section is accessible to a host device via an enclosure-specific protocol, the enclosure-specific protocol including at least one of an Ethernet protocol, a SATA protocol or a PCIe protocol.

21. The device of claim 12, wherein the interface section includes at least one of a PCIe switch, a PCIe hub, a PCIe bus, an Ethernet switch, an Infiniband switch, a Fibre Channel switch, or other communication fabric component.

* * * * *